United States Patent
Neo et al.

(10) Patent No.: US 12,159,487 B2
(45) Date of Patent: Dec. 3, 2024

(54) ACTION RECOGNITION APPARATUS, LEARNING APPARATUS, AND ACTION RECOGNITION METHOD

(71) Applicant: HITACHI, LTD., Tokyo (JP)

(72) Inventors: Atsushi Neo, Tokyo (JP); Yukiko Ogihara, Tokyo (JP)

(73) Assignee: HITACHI, LTD., Tokyo (JP)

( * ) Notice: Subject to any disclaimer, the term of this patent is extended or adjusted under 35 U.S.C. 154(b) by 272 days.

(21) Appl. No.: 17/369,123

(22) Filed: Jul. 7, 2021

(65) Prior Publication Data
US 2022/0076003 A1 Mar. 10, 2022

(30) Foreign Application Priority Data

Sep. 4, 2020 (JP) .................. 2020-148759
Mar. 9, 2021 (JP) .................. 2021-37260

(51) Int. Cl.
G06V 40/20 (2022.01)
G06F 18/21 (2023.01)
G06F 18/214 (2023.01)
G06F 18/2431 (2023.01)

(52) U.S. Cl.
CPC ............ G06V 40/23 (2022.01); G06F 18/214 (2023.01); G06F 18/217 (2023.01); G06F 18/2431 (2023.01)

(58) Field of Classification Search
None
See application file for complete search history.

(56) References Cited

U.S. PATENT DOCUMENTS

2006/0018516 A1 1/2006 Masoud et al.

FOREIGN PATENT DOCUMENTS

CN 108564132 A * 9/2018
JP 2012-101284 A1 5/2012

OTHER PUBLICATIONS

Yang et al., "Human Action Recognition Based on Fusion Features," Apr. 2019, Advances in Intelligent Systems and Computing, vol. 928, pp. 569-579 (Year: 2019).*

(Continued)

*Primary Examiner* — Vincent Rudolph
*Assistant Examiner* — Nicholas Crespo Stazer
(74) *Attorney, Agent, or Firm* — Volpe Koenig

(57) ABSTRACT

An apparatus is describe for detecting a shape of an object to be recognized from to-be-analyzed data; generating one or more components and respective contribution ratios of the components through a component analysis, based on the shape of the object to be recognized; determining an ordinal number indicating each dimension of the components based on a cumulative contribution ratio attained from the respective contribution ratios; selecting, among the group of action classification models, a specific action classification model in which learning was performed with the same component group as a specific component group including the components with the ordinal number indicating the dimension; and inputting the specific component group into the specific action classification model, thereby outputting recognition results indicating actions of the object to be recognized.

3 Claims, 24 Drawing Sheets

(56) References Cited

OTHER PUBLICATIONS

Angelini et al., "2D Pose-Based Real-Time Human Action Recognition With Occlusion-Handling," Sep. 2019, IEEE Transactions on Multimedia, vol. 22, No. 6, pp. 1433-1446 (Year: 2019).*

Luvizon et al., "Learning features combination for human action recognition from skeleton sequences," Pattern Recognition Letters, Elsevier, pp. 13-20, (May 10, 2017).

Yao et al., "3D Human Action Recognition Based on the Spatial-Temporal Moving Skeleton Descriptor," Proceedings of the IEEE International Conference on Multimedia and Expo (ICME), pp. 937-942, (Jul. 10, 2017).

Extended European Search Report issued on Dec. 9, 2021 for European Patent Application No. 21183349.6.

\* cited by examiner

| BODY FRAME POINT # | NAME | x | y |
|---|---|---|---|
| 300 | NOSE | $x_0$ | $y_0$ |
| 301 | NECK | $x_1$ | $y_1$ |
| 302 | RIGHT SHOULDER | $x_2$ | $y_2$ |
| 303 | RIGHT ELBOW | $x_3$ | $y_3$ |
| 304 | RIGHT WRIST | $x_4$ | $y_4$ |
| 305 | LEFT SHOULDER | $x_5$ | $y_5$ |
| 306 | LEFT ELBOW | $x_6$ | $y_6$ |
| 307 | LEFT WRIST | $x_7$ | $y_7$ |
| 308 | LOWER RIGHT BACK | $x_8$ | $y_8$ |
| 309 | RIGHT KNEE | $x_9$ | $y_9$ |
| 310 | RIGHT ANKLE | $x_{10}$ | $y_{10}$ |
| 311 | LOWER LEFT BACK | $x_{11}$ | $y_{11}$ |
| 312 | LEFT KNEE | $x_{12}$ | $y_{12}$ |
| 313 | LEFT ANKLE | $x_{13}$ | $y_{13}$ |
| 314 | RIGHT EYE | $x_{14}$ | $y_{14}$ |
| 315 | LEFT EYE | $x_{15}$ | $y_{15}$ |
| 316 | RIGHT EAR | $x_{16}$ | $y_{16}$ |
| 317 | LEFT EAR | $x_{17}$ | $y_{17}$ |

| # | NAME |
|---|---|
| 360 | ∠ NECK - RIGHT SHOULDER - RIGHT ELBOW |
| 361 | ∠ RIGHT SHOULDER - RIGHT ELBOW - RIGHT WRIST |
| 362 | ∠ NECK - LOWER RIGHT BACK - RIGHT KNEE |
| 363 | ∠ LOWER RIGHT BACK - RIGHT KNEE - RIGHT ANKLE |
| 364 | ∠ NECK - LOWER LEFT BACK - LEFT KNEE |
| 365 | ∠ LOWER LEFT BACK - LEFT KNEE – LEFT ANKLE |
| 366 | ∠ NECK - LEFT SHOULDER - LEFT ELBOW |
| 367 | ∠ LEFT SHOULDER - LEFT ELBOW - LEFT WRIST |

FIG.3

ACTION RECOGNITION APPARATUS, LEARNING APPARATUS, AND ACTION RECOGNITION METHOD

CLAIM OF PRIORITY

The present application claims priority from Japanese patent application JP 2020-148759 filed on Sep. 4, 2020 and Japanese patent application JP 2021-37260 filed on Mar. 9, 2021, the contents of which are hereby incorporated by reference into this application.

BACKGROUND

The present invention relates to an action recognition apparatus, a learning apparatus, and an action recognition method.

As background art of the relevant technical field, Japanese Patent Application Laid-Open Publication No. 2012-101284 discloses an intention estimation apparatus that identifies whether a given action by a person is the intended action without relying on a biological signal such as the surface myoelectric potential. This intention estimation apparatus acquires action information using a measurement method for the position of the person engaging in the action and the angle of the action to restrict the actions of the person to a range that can be achieved by the person, extracts the joint angle of the person engaging in the action as well as position information of the tip position of the part of the person engaging in the action and employs multivariate analysis, and uses a threshold for identifying whether the action performed by the person was intended, thereby identifying whether the action was intended without relying on biological signals such as the surface myoelectric potential.

In the technique disclosed in Japanese Patent Application Laid-Open Publication No. 2012-101284, in order to estimate the intention of the action by the person, a binary determination is made as to whether the action was intended, and thus, it is not possible to classify the intention of complex actions of a plurality of types, resulting in the risk that the accuracy in estimating the intention of the action is markedly decreased.

SUMMARY

An object of the present invention is to recognize, at a high accuracy, a plurality of types of actions of an object subjected to recognition.

An aspect of an action recognition apparatus disclosed in this application comprises: a processor executing programs; and a storage device storing the programs, wherein the action recognition apparatus can access a group of action classification models each learned for a component group, using component groups attained from a shape of an object to be learned through component analysis for generating statistical components in multivariate analysis, and actions of the object to be learned, wherein the processor performs: a detection process of detecting a shape of an object to be recognized from to-be-analyzed data; a component analysis process of generating one or more components and respective contribution ratios of said components through the component analysis, on the basis of the shape of the object to be recognized that was detected by the detection process; a determination process of determining an ordinal number indicating each dimension of said one or more components on the basis of a cumulative contribution ratio attained from the respective contribution ratios; a selection process of selecting, among the group of action classification models, a specific action classification model in which learning was performed with the same component group as a specific component group including one or more components with the ordinal number indicating the dimension determined by the determination process; and an action recognition process of inputting the specific component group into the specific action classification model selected by the selection process, thereby outputting recognition results indicating actions of the object to be recognized.

Another aspect of an action recognition apparatus disclosed in this application comprises: a processor executing programs; and a storage device storing the programs, wherein the action recognition apparatus can access a group of action classification models each learned for a component group, using component groups in an ascending order starting with a first variable attained from a shape of an object to be learned through dimension reduction for generating statistical components in multivariate analysis and actions of the object to be learned, wherein the processor performs: a detection process of detecting a shape of an object to be recognized from to-be-analyzed data; a dimension reduction process of generating one or more components and respective contribution ratios of said components through the dimension reduction, on the basis of the shape of the object to be recognized that was detected by the detection process; a determination process of determining an ordinal number indicating each dimension of the components in an ascending order starting with the first variable among said one or more components, on the basis of the respective contribution ratios; a selection process of selecting, among the group of action classification models, a specific action classification model in which learning was performed using the same component group as a specific component group from the first variable up to a component of the ordinal number indicating the dimension determined by the determination process; and an action recognition process of inputting the specific component group into the specific action classification model selected by the selection process, thereby outputting recognition results indicating actions of the object to be recognized.

An aspect of a learning apparatus disclosed in this application comprises: a processor executing programs; and a storage device storing the programs, wherein the processor performs: an acquisition process of acquiring training data including a shape and actions of an object to be learned; a component analysis process of generating one or more components by component analysis for generating statistical components in multivariate analysis, on the basis of the shape of the object to be learned acquired by the acquisition process; a control process of controlling an ordinal number indicating each dimension of said one or more components based on an allowable calculation amount; and an action learning process of learning actions of the object to be learned and generating an action classification model for classifying actions of the object to be learned on the basis of a component group including one or more components with the ordinal number indicating the dimension controlled by the control process, and actions of the object to be learned.

Another aspect of a learning apparatus disclosed in this application comprises: a processor executing programs; and a storage device storing the programs, wherein the processor performs: an acquisition process of acquiring training data including a shape and actions of an object to be learned; a dimension reduction process of generating one or more components by dimension reduction for generating statistical components in multivariate analysis, on the basis of the shape of the object to be learned that was acquired by the acquisition process; a control process of controlling an ordinal number indicating each dimension of components in an ascending order starting with the first variable among said one or more components, on the basis of an allowable calculation amount; an action learning process of learning actions of the object to be learned and generating an action classification model for classifying actions of the object to be learned on the basis of a component group starting with the first variable up to a component of the ordinal number indicating the dimension controlled by the control process, and actions of the object to be learned.

According to a representative embodiment of the present invention, it is possible to recognize, at high accuracy, a plurality of types of actions of an object subjected to recognition. Other features, aspects, and advantages of the subject matter will become apparent from the description, the drawings, and the claims.

BRIEF DESCRIPTION OF THE DRAWINGS

FIG. 3 is a descriptive view showing an example of the learning data.

DETAILED DESCRIPTION OF THE EMBODIMENTS

Figure 1:
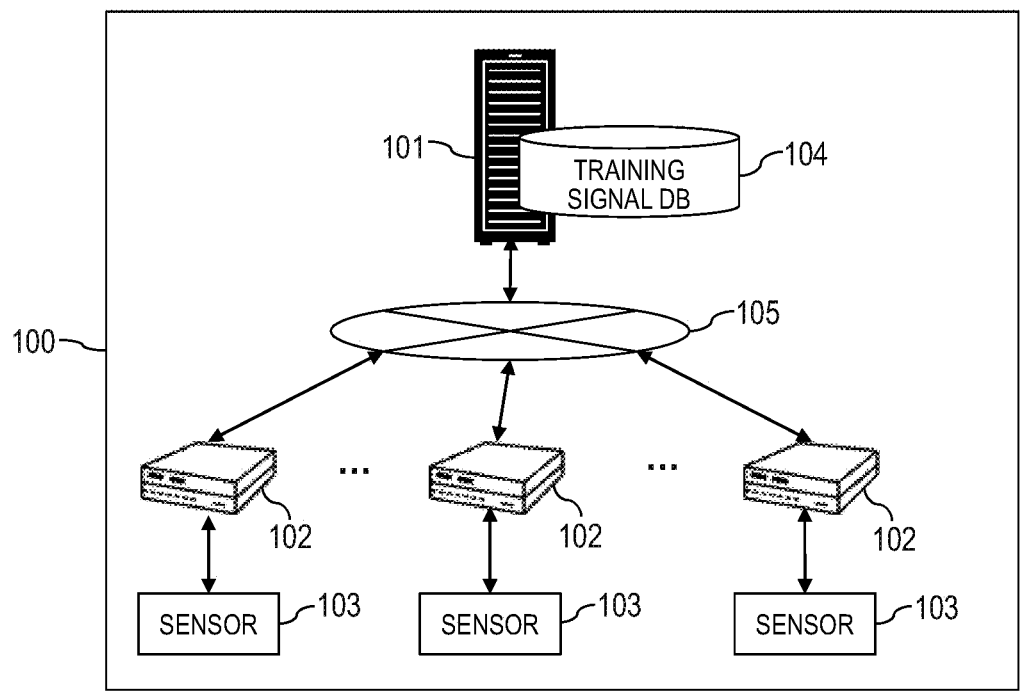
FIG. 1 is a descriptive view showing a system configuration example for an action recognition system of Embodiment 1.

Below, embodiments of the present invention will be explained with reference to drawings. In all of the drawings for describing the embodiments, the same reference characters are, as a rule, given to the same members, and redundant descriptions thereof are omitted. Furthermore, in the embodiments below, it is obvious that the constituent elements thereof (including element steps) are not strictly necessary unless otherwise noted or if such constituent elements are clearly understood to be necessary for a theoretical reason, for example. Also, if language such as "constituted from A," "constituted of A," "has A," or "includes A" is used, this obviously does not exclude the possibility of other elements being present unless it is explicitly stated that only the stated element is present, for example. Similarly, in the embodiments below, when referring to the shapes of constituent elements or the like or the positional relationships therebetween, for example, shapes that substantially approximate or are substantially similar to such shapes or the like are considered to be included unless otherwise explicitly noted or if this is obviously not the case for a theoretical reason, for example.

Indications such as "first," "second," and "third" in the present specification are for distinguishing constituent elements, and do not necessarily limit the number, order, or content thereof. Also, the numbers used for identifying the constituent elements are used within each context and the numbers used in one context do not necessarily indicate the same configuration in another context. Additionally, the fact that a constituent element is identified by a given number does not necessarily prevent this constituent element from additionally having the function of a constituent element identified by another number.

The positions, sizes, shapes, ranges, and the like of the components as shown in the drawings and the like are indicated for ease of understanding the invention, and in some cases do not represent the actual positions, sizes, shapes, ranges, and the like of those components. Thus, the present invention is not necessarily limited to the positions, sizes, shapes, ranges, and the like disclosed in the drawings and the like.

Embodiment 1

<Action Recognition System>

FIG. 1 is a descriptive view showing a system configuration example for an action recognition system of Embodiment 1. An action recognition system 100 has a server 101 and one or more clients 102. The server and the clients are connected to each other in a manner enabling communication therebetween via a network 105 such as the Internet, a LAN (local area network), or a WAN (wide area network). The server 101 is a computer that manages the clients 102. The clients 102 are computers that are each connected to a sensor 103 and acquire data from the sensor 103.

The sensors 103 detect to-be-analyzed data from an analysis environment. The sensors 103 are, for example, cameras that capture still images or videos. The sensors 103 may alternatively detect audio or odors. A training signal DB 104 is a database that stores, as training signals, combinations of learning data (body frame information and joint angles) and action information (postures or actions of a person such as "standing" or "collapsed," for example). The training signal DB 104 may be stored on the server 101, or may be connected to a computer that can communicate with the server 101 or the clients 102 via the network 105.

The action recognition system 100 has a learning function using the training signal DB 104 and an action recognition function using an action classification model attained by the learning function. The action classification model is a learning model for classifying actions of an object to be recognized such as a person or an animal. The learning function and the action recognition function may be installed in the server 101 or the clients 102 as long as such functions are installed in the action recognition system 100. The learning function may be installed in the server 101 and the action recognition function may be installed in the clients 102, for example. Alternatively, a configuration may be adopted in which both the learning function and the action recognition function are installed in the server 101, and the clients 102 transmit data from the sensors 103 to the server 101 and receive action recognition results attained by the action recognition function from the server 101.

Also, the clients 102 may have installed therein the learning function and the action recognition function, with the server 101 managing the action classification model and the action recognition results from the clients 102. Here, a computer having installed therein a learning function is referred to as a learning apparatus and a computer having installed therein at least the action recognition function, among the learning function and the action recognition function, is referred to as an action recognition apparatus. Also, in FIG. 1, an example was shown of a client-server type action recognition system 100, but a standalone action recognition system may be used instead. In Embodiment 1, for ease of description, the action recognition system 100, in which the server 101 has installed therein the learning function (learning apparatus) and the clients 102 have installed therein the action recognition function (action recognition apparatus), is described as an example.

<Hardware Configuration Example of Computer>

Figure 2:
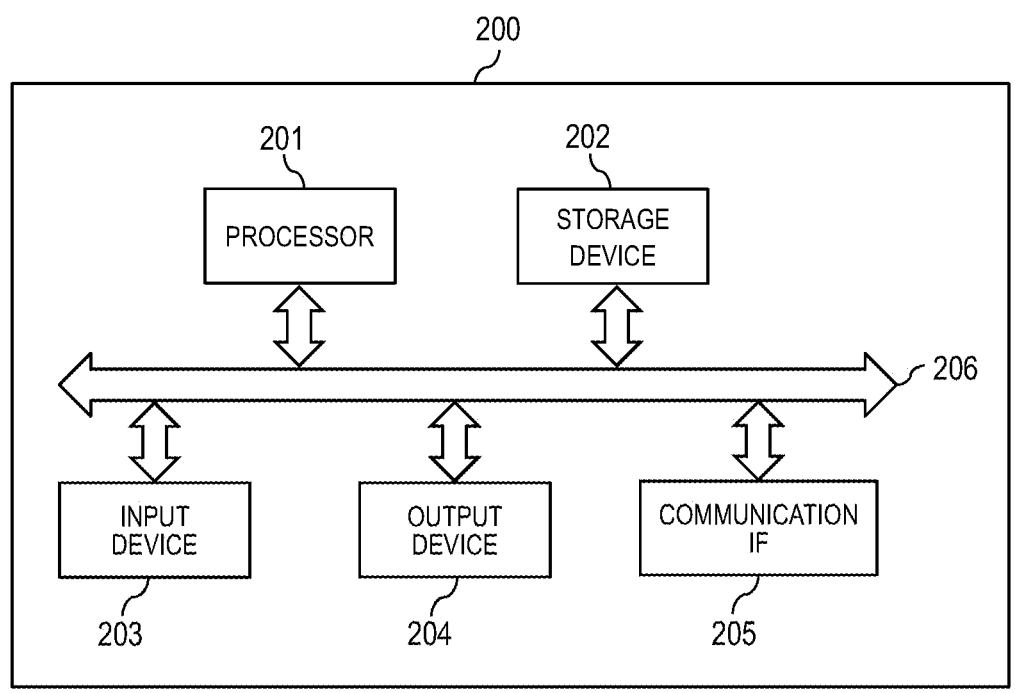
FIG. 2 is a block diagram for illustrating a hardware configuration example of each of computers.

FIG. 2 is a block diagram for illustrating a hardware configuration example of each of computers (the server 101 and the clients 102). A computer 200 includes a processor 201, a storage device 202, an input device 203, an output device 204, and a communication interface (communication IF) 205. The processor 201, the storage device 202, the input device 203, the output device 204, and the communication IF 205 are coupled to one another through a bus 206. The processor 201 is configured to control the computer 200. The storage device 202 serves as a work area for the processor 201. The storage device 202 is also a non-transitory or transitory recording medium configured to store various programs and various kinds of data. Examples of the storage device 202 include a read only memory (ROM), a random access memory (RAM), a hard disk drive (HDD), and a flash memory. The input device 203 is configured to input data. Examples of the input device 203 include a keyboard, a mouse, a touch panel, a numeric keypad, and a scanner. The output device 204 is configured to output data. Examples of the output device 204 include a display, a printer, and a speaker. The communication IF 205 is coupled to the network 105, and is configured to transmit and receive data.

<Learning Data>

FIG. 3 is a descriptive view showing an example of the learning data. The learning data 380 is constituted of body frame information 320 and joint angles 370 for each subject. The body frame information 320 is detected on the basis of to-be-analyzed data acquired from the sensors 103. The joint angles 370 are calculated on the basis of the body frame information 320. The learning data 380 for one subject is constituted of a combination of body frame information 320 and the joint angles 370 attained from a plurality of sequential frames in which the subject appears, for example.

The body frame information 320 has a name 321, an x coordinate value 322 on an x axis, and a y coordinate value 323 on a y axis that is perpendicular to the x axis for each of a plurality (18 in this example) of body frame points 300 to 317. Each of the joint angles 370 also has a name 371 for each of the plurality (18 in this example) of body frame points 300 to 317. In each name 371, ∠a-b-c (a, b, and c being the names 321 of the body frame points) is a joint angle 370 of a body frame point b formed by a line segment ab and a line segment bc. The body frame information 320 may include the joints of fingers, for example. Also, the joint angles 370 may include joint angles 370 other than what was mentioned above.

In FIG. 3, the coordinate values of the body frame points 300 to 317 constitute 2-dimensional position information (combination of x coordinate value and y coordinate value), but may instead be 3-dimensional position information. Specifically, a z coordinate value on a z axis (depth direction, for example) that is perpendicular to both the x axis and the y axis may be added.

<Functional Configuration Example of Action Recognition System 100>

Figure 4:
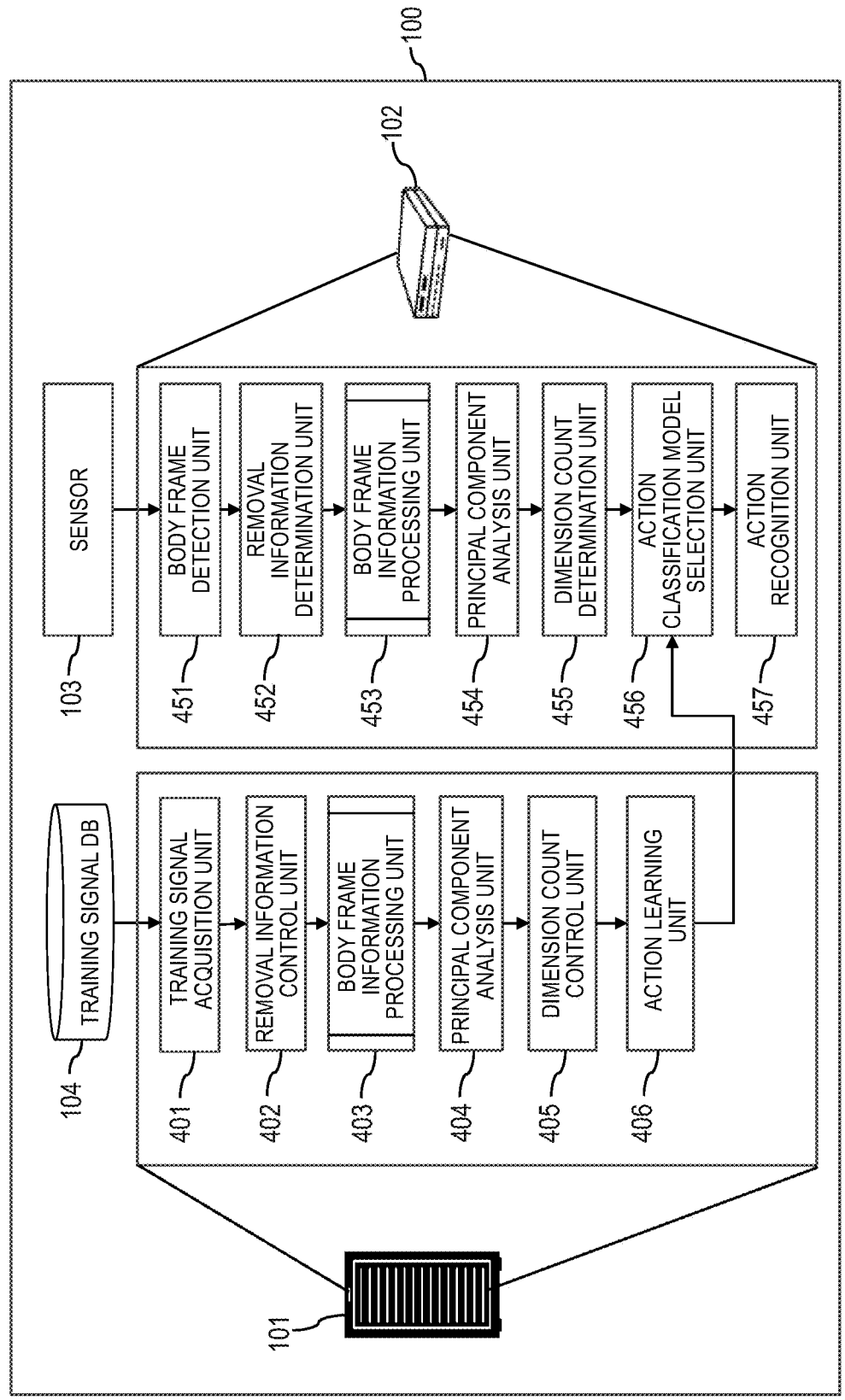
FIG. 4 is a block diagram showing a functional configuration example of the action recognition system according to Embodiment 1.

FIG. 4 is a block diagram showing a functional configuration example of the action recognition system 100 according to Embodiment 1. The server 101 has a training signal acquisition unit 401, a removal information control unit 402, a body frame information processing unit 403, a principal component analysis unit 404, a dimension count control unit 405, and an action learning unit 406. The client 102 has a body frame detection unit 451, a removal information determination unit 452, a body frame information processing unit 453, a principal component analysis unit 454, a dimension count decision unit 455, an action classification model selection unit 456, and an action recognition unit 457.

These units are specifically realized by a processor 201 executing programs stored in a storage device 202 shown in FIG. 2, for example. First, a functional configuration example of the server 101 will be described.

The training signal acquisition unit 401 acquires one or more training signals used for learning that were acquired from the training signal DB 104, and outputs a selected training signal to the removal information control unit 402.

The removal information control unit 402 removes a given body frame point from the body frame information 320 in the training signal acquired from the training signal acquisition unit 401. The number of body frame points to remove may be one or more, or none. The removal information control unit 402 updates the body frame information 320 in the training signal with the body frame information 320 subjected to removal of the body frame points (including cases in which no body frame points were removed). Also, in order to increase resistance to noise, the body frame information 320 may be updated by adding noise for offsetting the body frame point positions to the body frame information 320 when removing information.

The removal information control unit 402 outputs, to the body frame information processing unit 120, a training signal including removal information constituted of the name 321 and the position information (x coordinate value 322, y coordinate value 323) of the removed body frame point. Also, the removal information control unit 402 outputs the removal information to the action learning unit 406 via the body frame information processing unit 403, the principal component analysis unit 404, and the dimension count control unit 405.

The body frame information processing unit 403 processes the updated body frame information 320. Specifically, for example, the body frame information processing unit 403 calculates the joint angles 370 and the amount of movement between frames from the body frame information 320 within the updated training signal that was acquired. Also, the body frame information processing unit 403 eliminates absolute position information from the body frame information 320, and executes normalization such that the size of the body frame information 320 is constant. The body frame information processing unit 403 then outputs the joint angles 370, the amount of movement between frames, and the normalized body frame information 320 to the principal component analysis unit 404.

Figure 5:
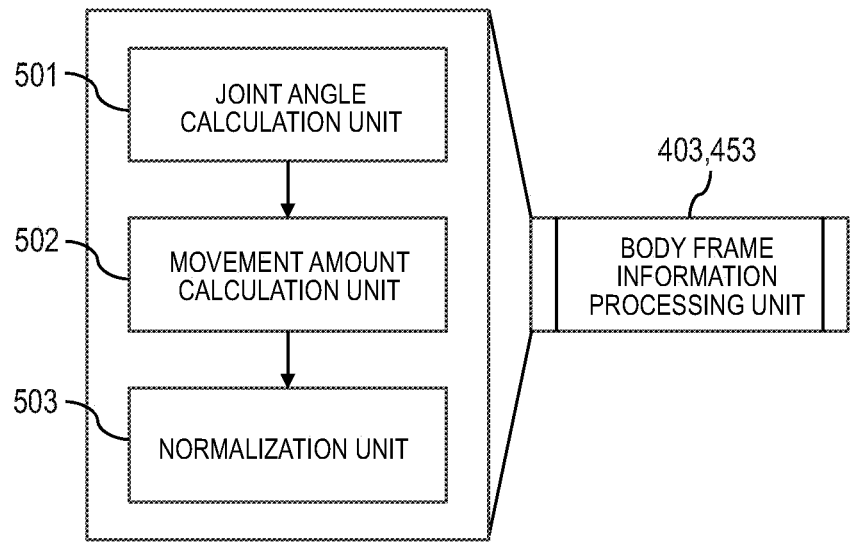
FIG. 5 is a block diagram showing a detailed functional configuration example of the body frame information processing units.

FIG. 5 is a block diagram showing a detailed functional configuration example of the body frame information processing units 403 and 453. The body frame information processing units 403 and 453 have a joint angle calculation unit 501, a movement amount calculation unit 502, and a normalization unit 503.

The joint angle calculation unit 501 calculates the joint angles 370 from the body frame information 320 in the acquired training signal, and outputs the joint angles 370 to the principal component analysis unit 404 via the movement amount calculation unit 502 and the normalization unit 503.

The movement amount calculation unit 502 calculates the amount of movement between frames from the body frame information 320 in the acquired training signal, and outputs the amount of movement to the principal component analysis unit 404 via the normalization unit 503.

The normalization unit 503 eliminates absolute position information from the body frame information 320 in the acquired training signal, executes normalization to set the size of the body frame information 320 to be uniform, and outputs the body frame information 320 to the principal component analysis unit 404.

In FIG. 4, the principal component analysis unit 404 uses, as input data, the normalized body frame information 320, the joint angles 370, and the amount of movement between frames, in the training signal acquired from the body frame information processing unit 403, to execute principal component analysis and generate one or more principal components, and outputs the principal components to the dimension count control unit 405. Among the body frame information 320, the joint angles 370, and the amount of movement between frames, at least the body frame information 320 should be input data.

As shown in equation (1), in principal component analysis, a coefficient wij is multiplied to each piece of input data xi, and the resulting products are added together to generate a principal component yi. A general equation for principal component analysis is shown in equation (2). As indicated in equation (3), the coefficient wij is set such that, where the variance of yi is defined as V(yi), the variance V(yi) is at the maximum value.

However, if there are no constraints to the coefficient wij, then the absolute quantity of the variance V(yi) can be infinitely large and the coefficient wij cannot be uniquely determined, and thus, it is preferable that the constraint of equation (4) be adopted. Also, in order to eliminate redundancy of information, it is preferable that the constraint of equation (5) be adopted such that the covariance of newly generated principal components yk and principal components yk that had been generated up to now is 0.

$$y_1 = w_{11}x_1 + w_{12}x_2 + w_{13}x_3 \ldots + w_{1p}x_p$$

$$y_2 = w_{21}x_1 + w_{22}x_2 + w_{23}x_3 \ldots + w_{2p}x_p$$

$$y_m = w_{m1}x_1 + w_{m2}x_2 + w_{m3}x_3 \ldots + w_{mp}x_p \quad (1)$$

(Wij IS A COEFFICIENT FOR DIMENSION REDUCTION)

$$y_i = \sum_{j=1}^{p} w_{ij}x_j (i = 1, 2, \ldots, m) \quad (2)$$

$$V(y_i) = \text{VARIANCE OF } y_i \quad (3)$$

$$\sum_{j=1}^{p} w_{ij}^2 = 1 \quad (4)$$

$$\text{Cov}(y_j, y_k) = \text{COVARIANCE OF } yj, yk = 0 \quad (5)$$

However, equations (4) and (5), which were indicated as constraints, are not limited thereto, and the coefficient wij may be calculated with another constraint condition or without constraints. If the variance V(yj) of the principal component yj newly generated in this manner is separately defined as λj as shown in equation (6), then as indicated in equation (7), the total of the variances V(xj) of the input data xj is equal to the total of λj.

$$V(y_j) = \lambda_j \quad (6)$$

$$\sum_{j=1}^{p} V(y_j) = \sum_{j=1}^{p} \lambda_j = \sum_{j=1}^{p} V(x_j) \quad (7)$$

Here, p is the number of pieces of input data xj. The higher the variance V(yj) of the newly generated principal component yj is, the greater the degree to which the original information is reflected in the principal component yj is, and the principal components are referred to as first, second, . . . mth principal components in order from the highest variance value. The ratio of the variance of the newly generated variable yj to the variance of the original data is referred to as the contribution ratio, and is indicated by equation (8). Also, the result of adding the contribution ratios in descending order of the variance values (ascending order of the ordinal numbers m of the principal components) starting with the contribution ratio of a first principal component is referred to as the cumulative contribution ratio, and is indicated by equation (9).

$$c_j = \frac{\lambda_j}{\lambda_1 + \lambda_2 + \ldots + \lambda_p} \quad (8)$$

$$QC_k = \sum_{j=1}^{k} c_j \quad (9)$$

The contribution ratios and the cumulative contribution ratio are measures indicating the degree to which the newly generated principal component yj or the generated plurality of principal components express the amount of information in the original data. Principal component analysis was used as one example of component analysis for generating statistical components in multivariate analysis, but independent component analysis, which is also an example of component analysis, may be executed instead of principal component analysis.

In the case of independent component analysis, the principal component is an independent component. The contribution ratio may be used, with the independent component serving as an indicator that indicates the degree of effect on the input data xi. In independent component analysis, the square sum of a mixing coefficient matrix in independent coefficient analysis of each independent component is the strength of each independent component.

The strength of the independent component indicates the variance of the independent component in the input data xi. In other words, the independent components attained by independent component analysis all have a variance of 1, and thus, the square sum of the mixing coefficients indicates the variance of the input data xi. The value attained by dividing the strength of an independent component by the sum of the strengths of all independent components may be set as the contribution ratio of the independent component.

The dimension count control unit 405 controls an ordinal number k indicating each dimension of one or more components. Specifically, for example, the dimension count control unit 405 determines up to how many dimensions of principal components, which are used for learning by the action learning unit 406, to use in descending order of the variance values, among the acquired principal components, and outputs the principal components from the first principal component to the kth principal component having the determined dimension k as the ordinal number (k being an integer of 1 or greater) to the action learning unit 406 in descending order of the variance values.

The action learning unit 406 learns the principal components acquired from the dimension count control unit 405 and action information in the training signal acquired from the training signal DB 104 in association with each other. Specifically, for example, the action learning unit 406 generates an action classification model through machine learning, with the principal component group including the first to kth principal components acquired from the dimension count control unit 405 as the input data and the action information in the training signal acquired from the training signal DB 104 as the output data. The action learning unit 406 outputs, to the action classification model selection unit 456, the action classification model, which was generated as a result of learning, in association with the removal information acquired from the removal information control unit 402.

Next, a functional configuration example of the clients 102 will be described. The body frame detection unit 451 detects the body frame information 320 of a person appearing in the to-be-analyzed data acquired from the sensor 103 and outputs the body frame information 320 to the removal information determination unit 452. There is no limitation to the method for detecting the body frame information 320, and a neural network (NN) that can estimate the body frame information 320 of the person generated by machine learning may be used for detection of the body frame information 320, or markers may be applied to body frame points of a person to be detected, with the body frame information 320 being detected from the marker positions appearing in the image.

The removal information determination unit 452 determines whether there are body frame points that cannot be acquired due to occlusion or the like within the body frame information 320 detected by the body frame detection unit 451, and if there are body frame points that could not be acquired, then the position information thereof is set to be removal information, and the body frame information 320 detected by the body frame detection unit 451 is outputted to the body frame information processing unit 453. Also, the removal information determination unit 452 outputs the removal information to the action classification model selection unit 456 via the body frame information processing unit 453, the principal component analysis unit 454, and the dimension count decision unit 455.

The body frame information processing unit 453 has a similar function to the body frame information processing unit 403. The body frame information processing unit 453 executes a similar process to the body frame information processing unit 403 on the body frame information 320 detected by the body frame detection unit 451, and outputs, to the principal component analysis unit 454, the joint angles 370, the amount of movement between frames, and normalized body frame information 320.

The principal component analysis unit 454 has a similar function to the principal component analysis unit 404. The principal component analysis unit 454 executes a similar process to the principal component analysis unit 404 on the output data from the body frame information processing unit 453, and generates one or more principal components. Also, the principal component analysis unit 454 outputs, to the dimension count decision unit 455, the contribution ratio and the cumulative contribution ratio generated together with the principal components.

The dimension count decision unit 455 determines the ordinal number k indicating each dimension of one or more components on the basis of the cumulative contribution ratio attained from the contribution ratios. Specifically, for example, the dimension count decision unit 455 determines the dimension count k indicating the principal components of how many dimensions to output to the action classification model selection unit 456 in descending order of variance among the acquired principal components, according to the acquired contribution ratios and cumulative contribution ratio. The dimension count k is the ordinal number k indicating the dimension of the principal component. For example, in the case of the first principal component, the dimension count (ordinal number) k is 1, and in the case of a second principal component, the dimension count (ordinal number) k is 2. The dimension count decision unit 455 outputs, to the action classification model selection unit 456, the principal component group from the first principal component to the kth principal component in descending order of variance.

The action classification model selection unit 456 selects an action classification model with which the same removal information as that acquired from the removal information determination unit 452 is associated, among the action classification models with which the removal information generated by the removal information control unit 402 was associated, and in which action learning was performed with the principal component group (first to kth principal components) up to the kth dimension determined by the dimension count decision unit 455. The action classification model selection unit 456 outputs, to the action recognition unit 457, the action classification model selected together with the principal component group from the first to kth principal components.

In the case of 2-dimensional images in particular, there is a possibility that not all defined body frame points can be acquired due to occlusion or the like, and there is a possibility that the body frame detection unit 451 generates body frame information 320 in which some of the body frame points that could not be acquired are removed. If performing action recognition for body frame information 320 in which some of the body frame points were removed, the client 102 performs action recognition using an action learning model with which the removal information of the body frame information 320 with removed body frame points that was detected by the body frame detection unit 451 is associated. As a result, high accuracy action recognition can be realized even with body frame information 320 in which some of the body frame points are removed.

There are some cases in which an action classification model with which the same removal information as that acquired from the removal information determination unit 452 is associated, among the action classification models with which the removal information generated by the removal information control unit 402 and acquired from the action learning unit 406 is associated, and in which action learning was performed with the same principal components (first to kth principal components) as the ordinal number k indicating the dimension of the principal component determined by the dimension count decision unit 455 is not generated.

In this case, the action classification model selection unit 456 may select the action classification model with the most similar conditions (such as an action classification model with which removal information within a prescribed distance from the position information of the removed body frame points is associated, or an action classification model in which action learning for the first to (k−1)th principal components was performed, for example).

The action recognition unit 457 recognizes the action of a person appearing in the to-be-analyzed data acquired from the sensor 103 on the basis of the selected action classification model and the principal component group from the first to kth principal components. Specifically, for example, the action recognition unit 457 inputs the principal component group (first to kth principal components) attained from the to-be-analyzed data to the selected action classification model, thereby outputting prediction values indicating the action of the person appearing in the to-be-analyzed data as recognition results.

<Example of Joint Angle Calculation>

Figure 6:
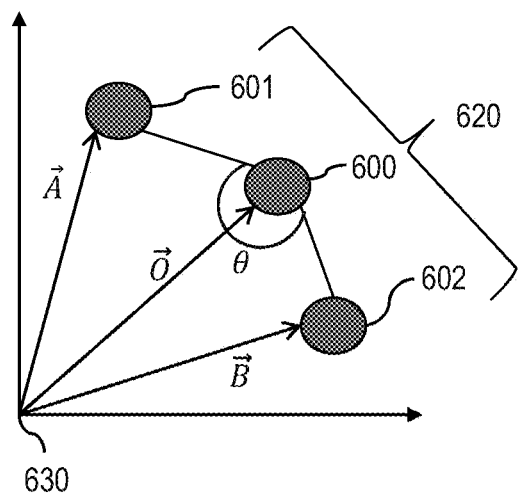
FIG. 6 is a descriptive view indicating a detailed calculation method for the joint angles executed by the joint angle calculation unit.

FIG. 6 is a descriptive view indicating a detailed calculation method for the joint angles 370 executed by the joint angle calculation unit 501. The joint angle calculation unit 501 calculates a joint angle θ for three linked body frame points 600 to 602. The respective pieces of body frame information 620 of the body frame points 600 to 602 are defined as position vectors O, A, and B based on an origin point 630. The joint angle calculation unit 501 calculates the relative vectors with the body frame point 600 as the origin point according to equations (10) and (11), equation (12) is satisfied by the calculated vectors, and the joint angle θ is calculated by determining the arccosine as indicated in equation (13).

$$\vec{OA} = \vec{A} - \vec{O} \tag{10}$$

$$\vec{OB} = \vec{B} - \vec{O} \tag{11}$$

$$\cos\theta = \frac{\vec{OA} \cdot \vec{OB}}{|\vec{OA}||\vec{OB}|} \tag{12}$$

$$\theta = \cos^{-1} \frac{\vec{OA} \cdot \vec{OB}}{|\vec{OA}||\vec{OB}|} \tag{13}$$

<Example of Calculating Amount of Movement Between Frames>

Figure 7:
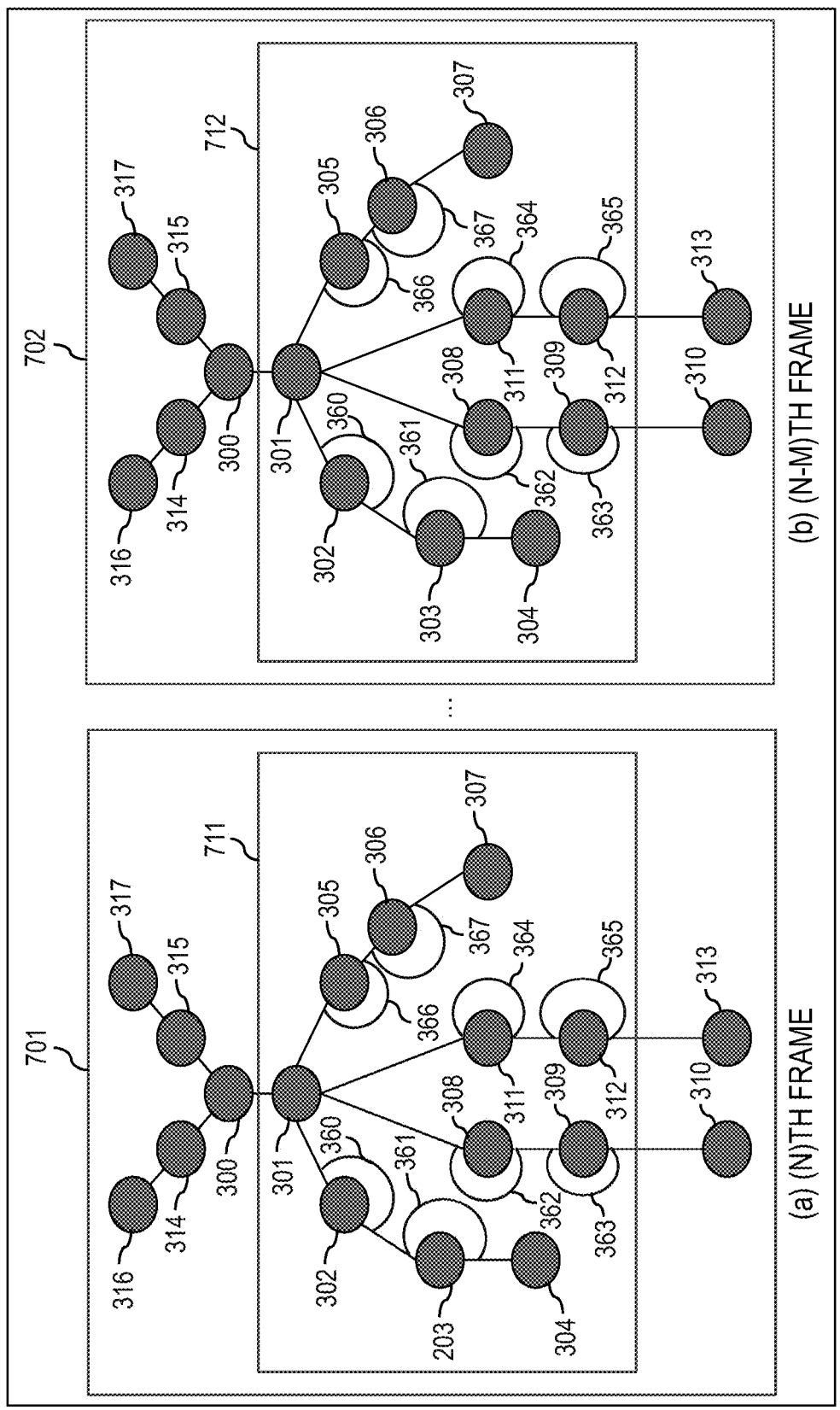
FIG. 7 is a descriptive view showing an example of a detailed calculation method for the amount of movement between frames executed by the movement amount calculation unit.

FIG. 7 is a descriptive view showing an example of a detailed calculation method for the amount of movement between frames executed by the movement amount calculation unit 502. The movement amount calculation unit 502 uses the body frame information 701 of the Nth frame and the body frame information 702 of the (N-M)th frame of the same subject to calculate the amount of movement between frames. N and M are integers of 1 or greater and N>M. The value of M can be set arbitrarily. As indicated in equations (14) to (16), the movement amount calculation unit 502 calculates the distances of the same body frame points 300 to 317 of the same person shown in each frame. The amount of movement of the 18 body frame points 300 to 317 between the frames is the amount of movement between frames of the person.

$$dis_0 = (x_0|_{frame=n-m} - x_0|_{frame=n})^2 + (y_0|_{frame=n-m} - y_0|_{frame=n})^2 \tag{14}$$

$$dis_1 = (x_1|_{frame=n-m} - x_1|_{frame=n})^2 + (y_1|_{frame=n-m} - y_1|_{frame=n})^2 \tag{15}$$

...

$$dis_{17} = (x_{17}|_{frame=n-m} - x_{17}|_{frame=n})^2 + (y_{17}|_{frame=n-m} - y_{17}|_{frame=n})^2 \tag{16}$$

However, calculation of the amount of movement between frames executed by the movement amount calculation unit 502 is not limited thereto, and as shown in equation (17), the movement amount calculation unit 502 may calculate the respective distances of the same body frame points 300 to 317 of the same person shown in the respective frames, with the total movement amount between frames of all 18 body frame points 300 to 317 being set as the movement amount between frames for the person.

$$\sum_{i=0}^{17}\{(x_i|_{frame=n-m} - x_i|_{frame=n})^2 + (y_i|_{frame=n-m} - y_i|_{frame=n})^2\} \quad (17)$$

Also, the movement amount calculation unit 502 may use center of mass body frame information 711 and center of mass body frame information 712 serving as centers of mass of the body frame information 701 of the nth frame and the body frame information 702 of the (n-m)th frame. Specifically, for example, the movement amount calculation unit 502 may calculate the center of mass of each person as indicated in equations (18) and (19), and may calculate the amount of movement between frames of a person in relation to the calculated center of mass as indicated in equation (20).

$$CenterX = \frac{x_1 + x_2 + x_3 + x_4 + x_5 + x_6 + x_7 + x_8 + x_9 + x_{10} + x_{11} + x_{12}}{11} \quad (18)$$

$$CenterY = \frac{y_1 + y_2 + y_3 + y_4 + y_5 + y_6 + y_7 + y_8 + y_9 + y_{10} + y_{11} + y_{12}}{11} \quad (19)$$

$$disCenter = (CenterX|_{frame=n-m} - CenterX|_{frame=n})^2 + \quad (20)$$
$$(CenterY|_{frame=n-m} - CenterY|_{frame=n})^2$$

<Example of Normalization>

Figure 8:
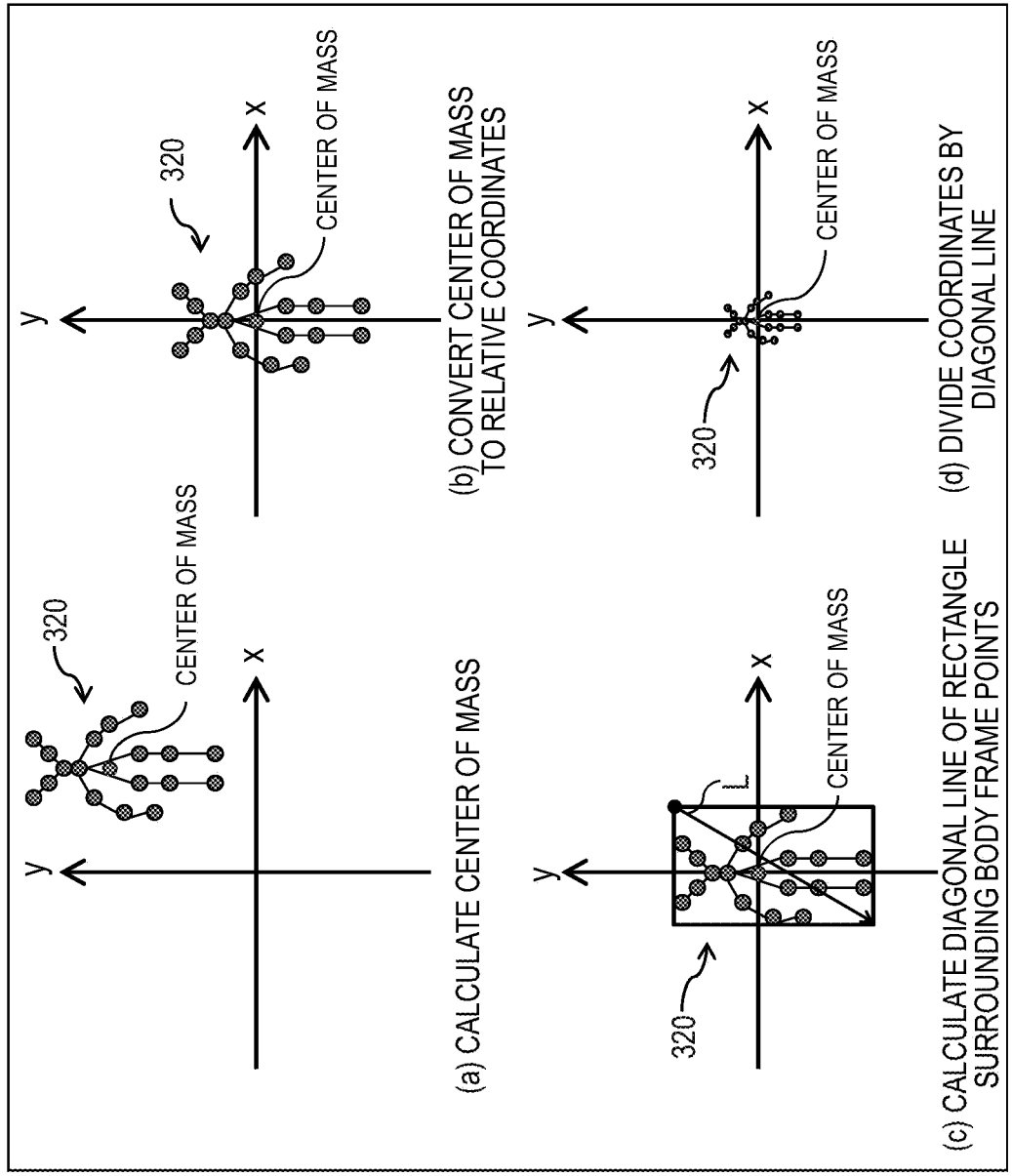
FIG. 8 is a descriptive view indicating a detailed normalization method for the body frame information executed by the normalization unit.

FIG. 8 is a descriptive view indicating a detailed normalization method for the body frame information 320 executed by the normalization unit 503. First, the normalization unit 503 (a) calculates the center of mass from some or all of the body frame information 320 and (b) converts the center of mass to relative coordinates with the center of mass as the origin point. Then, the normalization unit 503 divides, (c) by a length L of the diagonal line of the smallest possible rectangle surrounding the 18 body frame points 300 to 317, (d) the position information of each body frame point of the body frame information 320. If the body frame information 320 attained in (d) is the training signal, the position information of the body frame points 300 to 317 that have undergone division are also incorporated.

If the normalization unit 503 is not executed, for example, then if learning is executed for body frame detection and action classification for an action such as "a person who is 180 cm in height sits at location A," a determination such as "the person does not sit anywhere other than location A" and "no one other than a person who is 180 cm in height sits" could be made. The normalization unit 503 executes normalization of the body frame information 320 to eliminate absolute position information and absolute information regarding the body frame size in order to eliminate such limitations and maintain versatility in action classification.

<Training Signal Retained by Training Signal DB 104>

Figure 9:
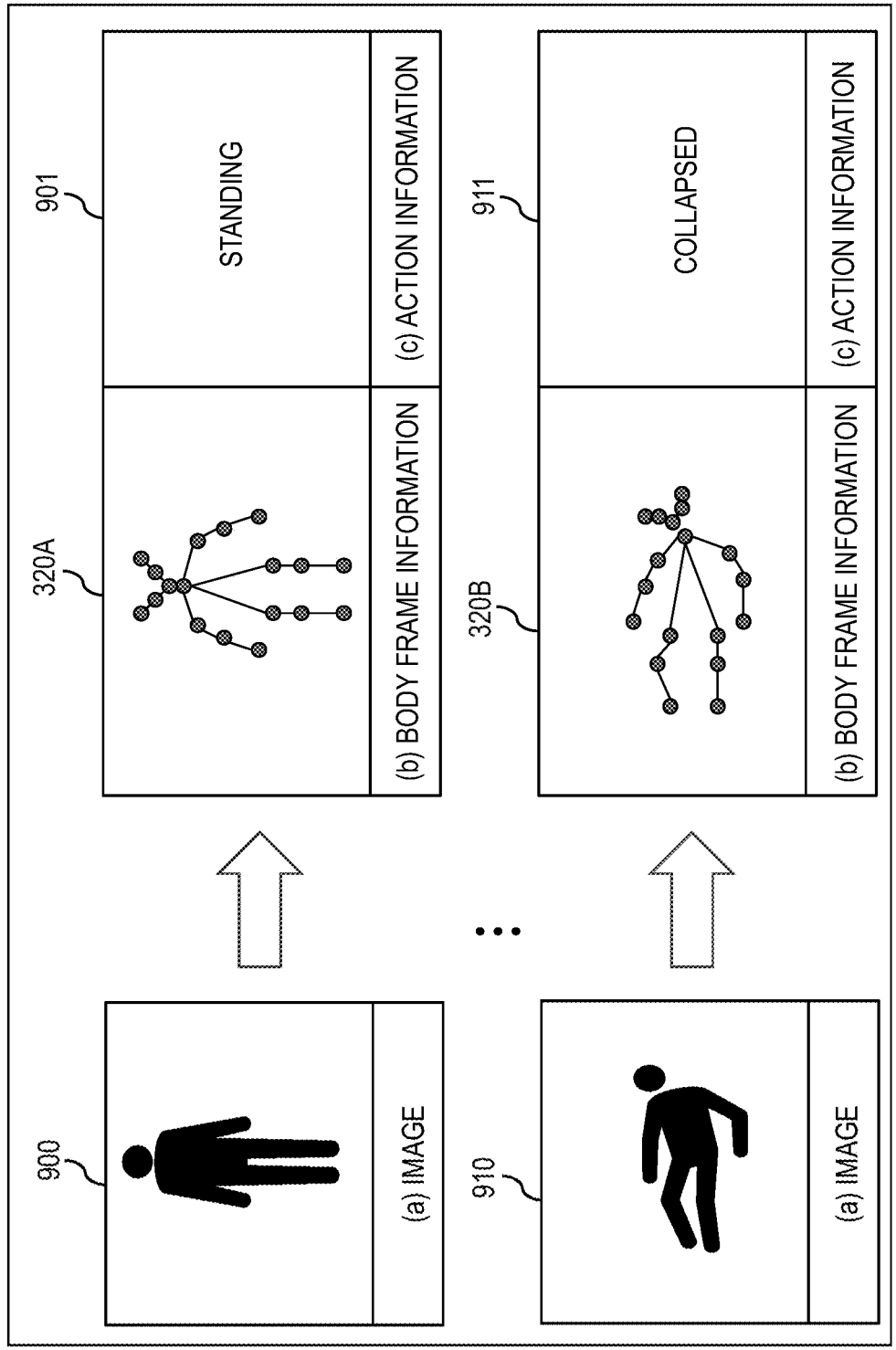
FIG. 9 is a descriptive view showing a detailed example of a training signal retained by the training signal DB.

FIG. 9 is a descriptive view showing a detailed example of a training signal retained by the training signal DB 104. Regarding (a) a person appearing in an image 900 serving as the to-be-analyzed data, the combination of (b) the body frame information 320A, the joint angles 370 (not shown), and (c) action information 901 ("standing") associated with the body frame information 320A serves as the training signal. Similarly, regarding (a) a person appearing in an image 910 serving as the to-be-analyzed data, the combination of (b) the body frame information 320B, the joint angles 370 (not shown), and (c) action information 911 ("collapsed") associated with the body frame information 320B serves as the training signal.

<Dimension Count Control by Dimension Count Control Unit 405 and Action Learning by Action Learning Unit 406>

Figure 10:
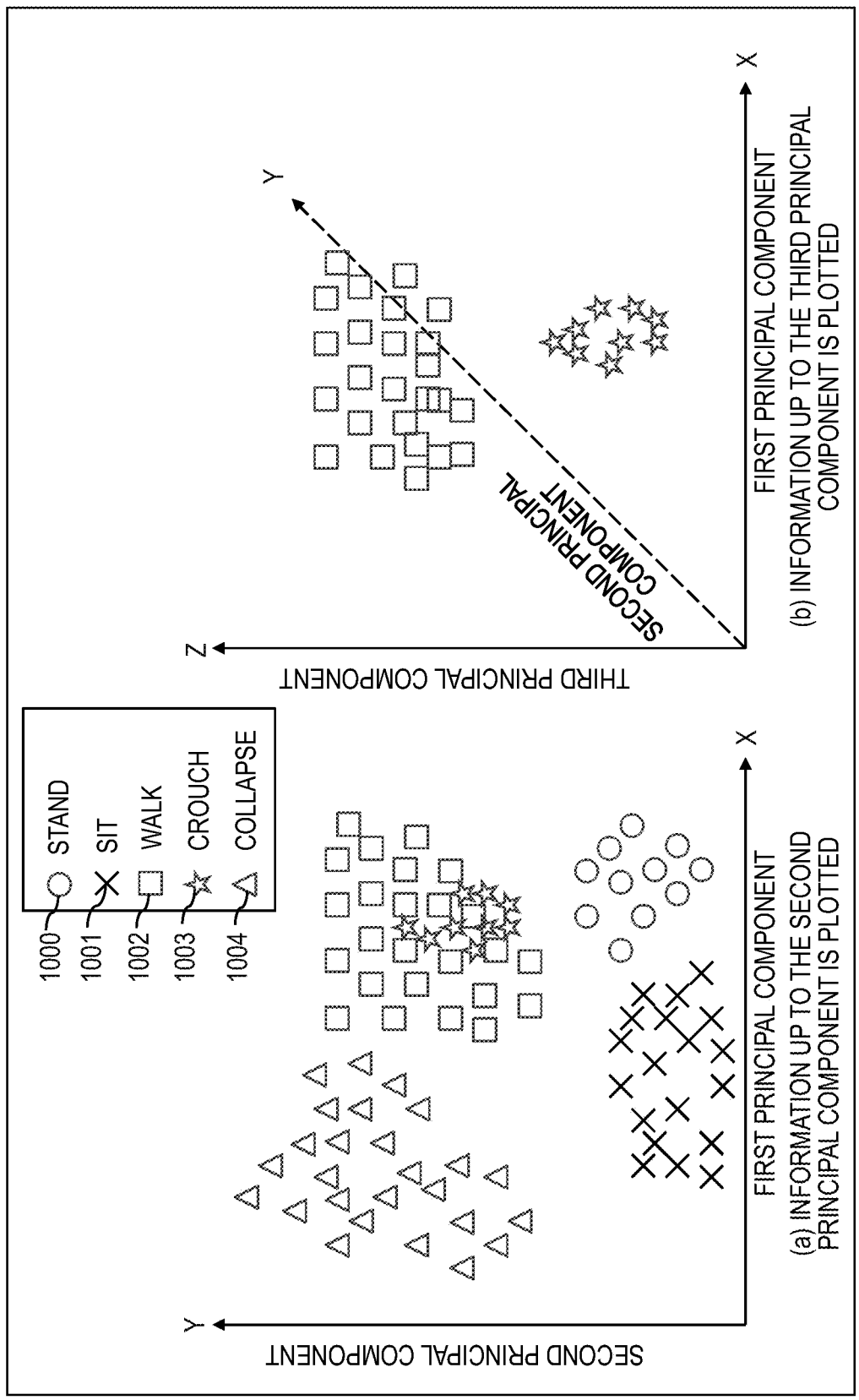
FIG. 10 is a descriptive view showing an example in which the principal components generated by the principal component analysis unit with the training signal as input data are plotted on a principal component space.

FIG. 10 is a descriptive view showing an example in which the principal components generated by the principal component analysis unit 404 with the training signal as input data are plotted on a principal component space. The key indicates the action information 1000 to 1004 included in the training signal.

In FIG. 10, (a) shows an example in which the X axis has the first principal component and the Y axis has the second principal component, and information up to the second principal component is plotted on a 2-dimensional plane. (b) shows an example in which the X axis has the first principal component, the Y axis has the second principal component, and the Z axis has a third principal component, and information up to the third principal component is plotted in a 3-dimensional space.

In (a), "stand" 1000, "sit" 1001, and "collapse" 1004 appear to be distinguishable even on a 2-dimensional plane up to the second principal component, but "walk" 1002 and "crouch" 1003 appear difficult to distinguish on a 2-dimensional plane up to the second principal component. In (b), if "walk" 1002 and "crouch" 1003 are plotted in a 3-dimensional space including up to the third principal component, the possibility for distinguishing "walk" and "crouch" can be increased.

Thus, if many principal components generated by the principal component analysis unit 404 are used, then it is possible to classify actions at a high accuracy. However, if many ordinal numbers k indicating the dimensions of the principal components are used, then the amount of calculation to be performed increases, and thus, it is necessary to determine which principal components to consider and how many dimensions to use in the space to represent the actions according to accuracy and the amount of calculation required.

Thus, the dimension count control unit 405 changes the maximum ordinal number of the principal component used in learning performed by the action learning unit 406, and outputs, to the action learning unit 406, the principal component group from the first principal component to the principal component of the maximum ordinal number. Specifically, for example, the required accuracy for the above-mentioned action classification (e.g., the ordinal numbers indicating the minimum required dimensions of the principal components) and/or an allowable calculation amount is/are set in advance, and the dimension count control unit 405 changes the maximum ordinal number of the principal component used in learning performed by the action learning unit 406, and determines the ordinal number that satisfies the required accuracy and/or the allowable calculation amount to the greatest extent possible.

In the case of a condition that the required accuracy is the ordinal number "3" (third principal component) indicating the dimension, for example, the dimension count control unit 405 sets the maximum ordinal number to "3" and outputs a principal component group from the first principal component to the third principal component to the action learning unit 406.

Also, if an allowable calculation amount is set as a condition, the dimension count control unit 405 sequentially acquires the calculation amounts in ascending order starting with the first principal component, the maximum ordinal number is set to an ordinal number (e.g. "4") one less than the ordinal number (e.g. "5") for when the allowable calculation amount is initially exceeded, and a principal component group from the first principal component to a fourth principal component with the maximum ordinal number of k=4 is outputted to the action learning unit 406.

Also, in the case of a condition in which the required accuracy is greater than or equal to an ordinal number of "3" indicating the dimension (third principal component) and if an allowable calculation amount is set as a condition, then if the cumulative calculation amount up to the third principal component is less than or equal to the allowable calculation amount, then the dimension count control unit 405 changes the maximum ordinal number from "3" to "4." If the cumulative calculation amount up to the fourth principal component exceeds the allowable calculation amount, then the dimension count control unit 405 sets the maximum ordinal number k to "3" and outputs a principal component group from the first principal component to the third principal component to the action learning unit 406.

Meanwhile, if the cumulative calculation amount up to the third principal component exceeds the allowable calculation amount, then the dimension count control unit 405 changes the maximum ordinal number from "3" to "2." If the cumulative calculation amount up to the second principal component is less than or equal to the allowable calculation amount, then the dimension count control unit 405 sets the maximum ordinal number k to "2" and outputs a principal component group from the first principal component to the second principal component to the action learning unit 406.

The principal component group to be outputted to the action learning unit 406 need not be limited to being in ascending order from the first principal component. The dimension count control unit 405 may instead acquire only a specific number of principal components in a predetermined principal component group. Alternatively, the dimension count control unit 405 may set the principal component group to be outputted to the action learning unit 406 upon eliminating specific principal components within the principal component group. In this manner, the principal component group to be outputted to the action learning unit 406 is not limited to being in ascending order from the first principal component.

In this case as well, if the allowable calculation amount is set as a condition, the dimension count control unit 405 sequentially acquires calculation amounts in ascending order of the ordinal numbers for the above-mentioned principal component group not limited to being in ascending order from the first principal component, and outputs, to the action learning unit 406, the principal component group up to an ordinal number one less than the ordinal number when the allowable calculation amount is initially exceeded. If, for example, the principal component group were constituted of the second principal component, the third principal component, and a fifth principal component, then if the allowable calculation amount is not exceeded with the second principal component and the allowable calculation amount is not exceeded with the second principal component and the third component, but the allowable calculation amount is exceeded for the first time with the second principal component, the third principal component, and the fifth principal component, then the dimension count control unit 405 may set the principal component group including the second principal component to the third principal component, which is one prior to the fifth principal component, as the principal component group to be outputted to the action learning unit 406.

The action learning unit 406 performs action learning in advance according to a plurality of conditions, generates an action classification model, and outputs the action classification model to the action classification model selection unit 456. By selecting an action classification model according to the situation from among a plurality of action classification models generated in this manner, it is possible to realize versatile and high accuracy action recognition.

Figure 11:
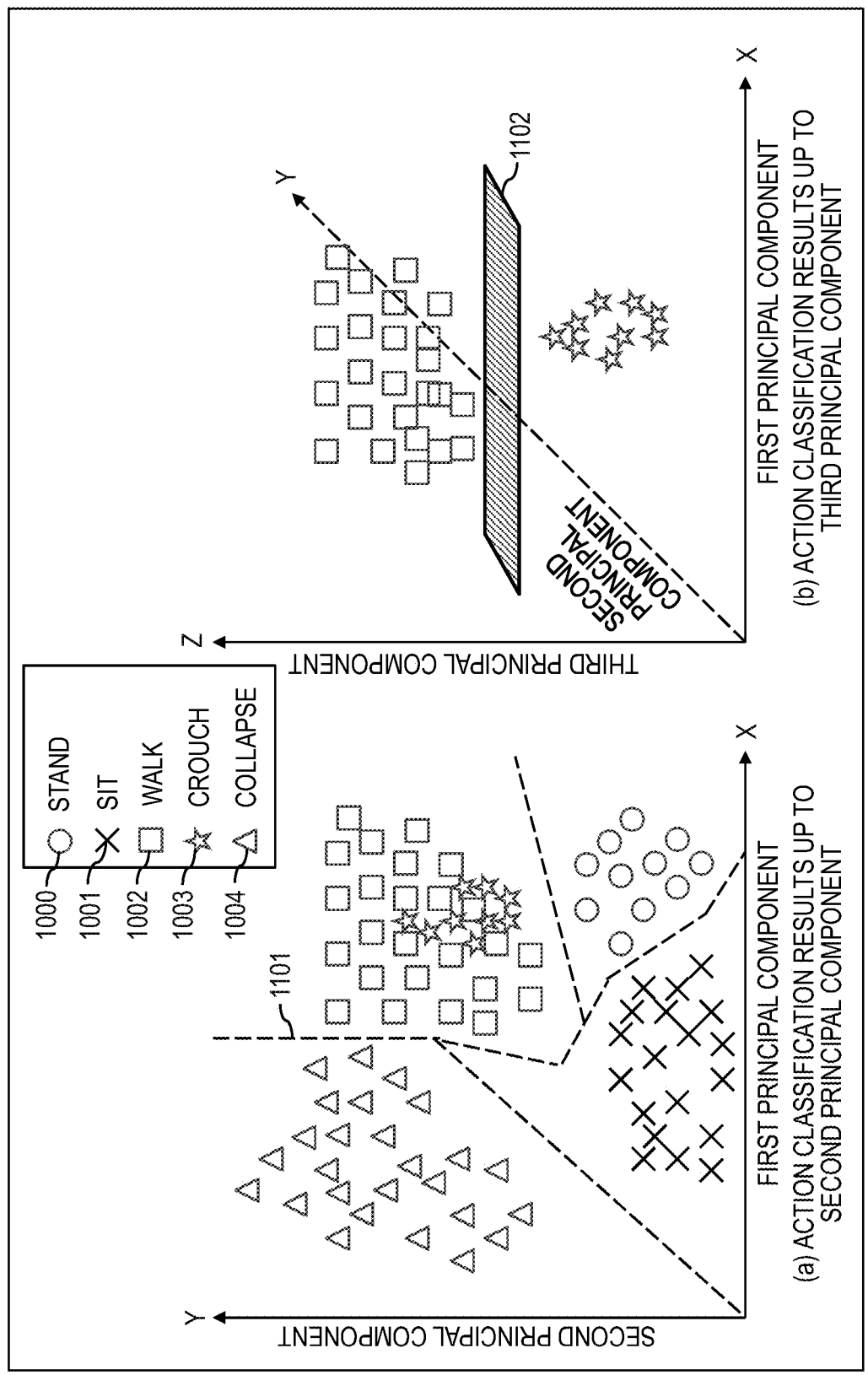
FIG. 11 is a descriptive view showing a detailed method in which the action learning unit learns actions and the action recognition unit classifies the actions.

FIG. 11 is a descriptive view showing a detailed method in which the action learning unit 406 learns actions and the action recognition unit 457 classifies the actions. Regarding actions in a principal component space, the action learning unit 406 uses (a) boundary lines 1101 and/or (b) a boundary plane 1102 to classify each action into a given region. The action learning method is not limited to any one method, and as a method for learning and classifying actions, k-means clustering, a support-vector machine, a decision tree, a random forest, or the like may be used.

The action recognition unit 457 recognizes actions using the action classification model learned and generated by the action learning unit 406. Specifically, for example, the client 102 uses principal component analysis for newly inputted body frame information 320, determines the region to which the newly generated principal component belongs according to the boundary lines 1101 and the boundary plane 1102 set by the action classification model, and recognizes the action according to the determined region.

Figure 12:
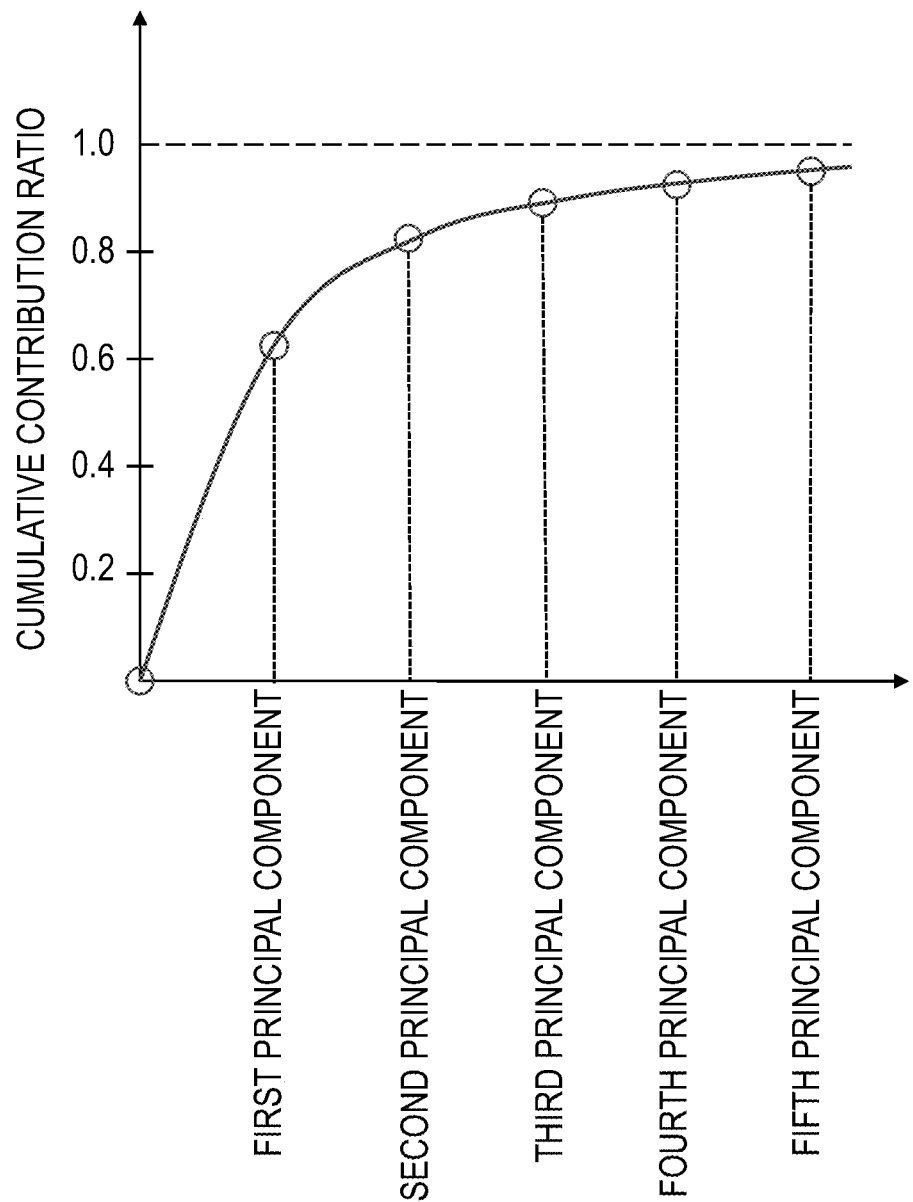
FIG. 12 is a graph that indicates the progression of the cumulative contribution ratio used by the dimension count decision unit in determining the dimension count.

FIG. 12 is a graph that indicates the progression of the cumulative contribution ratio used by the dimension count decision unit 455 in determining the dimension count. The cumulative contribution ratio is a measure for indicating the degree to which the newly generated plurality of principal components represents the amount of information in the data. Thus, even if the number of principal components were increased and the dimension count for action classification were increased, if there is no increase in the cumulative contribution ratio, no major improvement in accuracy can be expected.

Thus, the dimension count decision unit 455 uses only the number of principal components necessary for exceeding a predetermined threshold for the cumulative contribution ratio to determine the dimension count. If the predetermined threshold for the cumulative contribution ratio were "0.8," the condition is satisfied up to the second principal component, and thus, the dimension count k in this case is set to "2," and the first principal component and the second principal component are outputted to the action classification model selection unit 456.

The principal component group to be outputted to the action classification model selection unit 456 need not be limited to being in ascending order from the first principal component. The dimension count decision unit 455 may, for example, determine the combination of ordinal numbers k of the principal components by which the predetermined threshold for the cumulative contribution ratio is not exceeded but the cumulative contribution ratio reaches a maximum. Also, the dimension count decision unit 455 may select such a combination of ordinal numbers k of the principal components from among the principal component group used in the action classification model. In this manner, the principal component group to be outputted to the action classification model selection unit 456 is not limited to being in ascending order from the first principal component.

<Learning Process>

Figure 13:
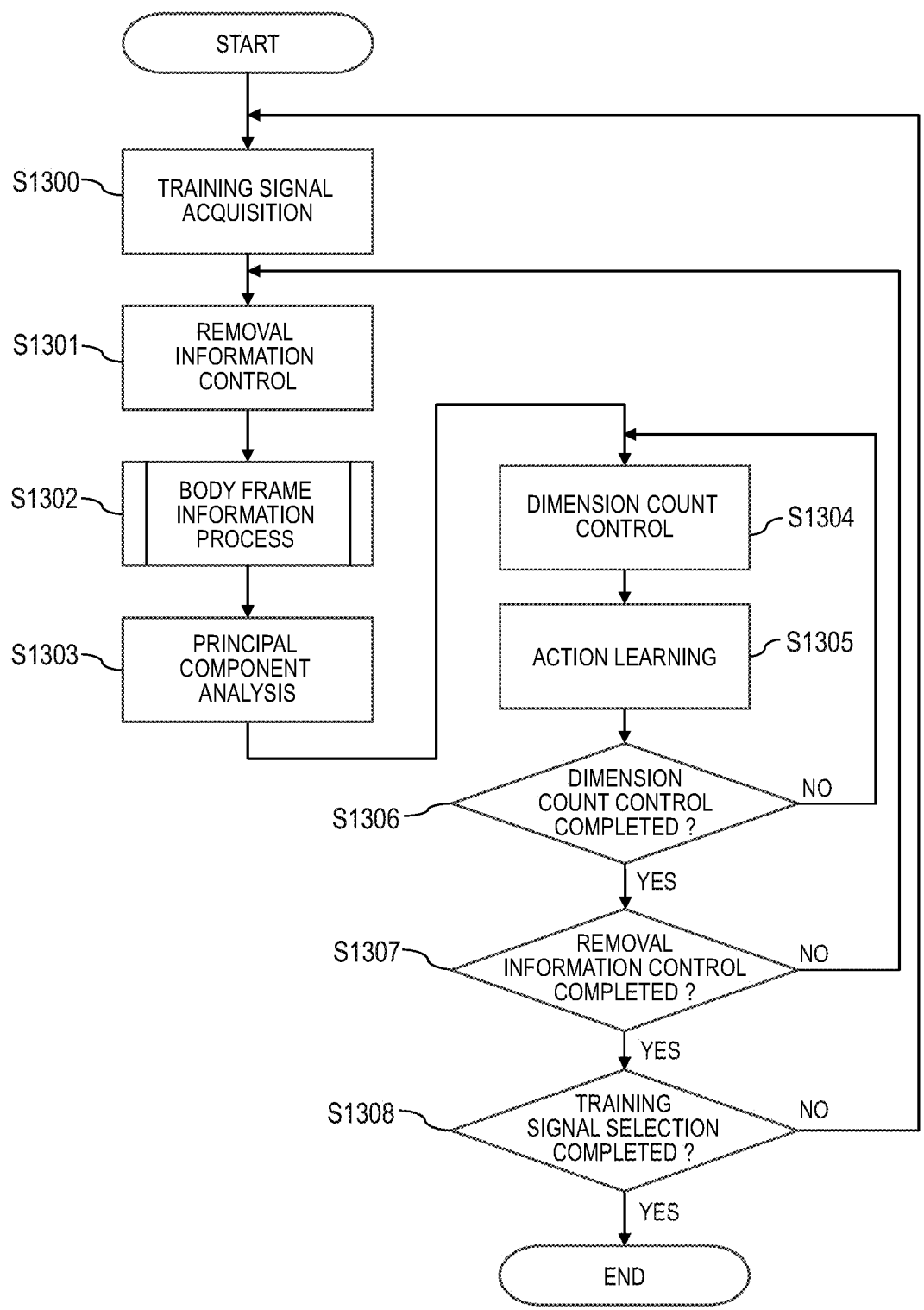
FIG. 13 is a flowchart showing an example of detailed process steps of a learning process performed by the server (learning apparatus) according to Embodiment 1.

FIG. 13 is a flowchart showing an example of detailed process steps of a learning process performed by the server 101 (learning apparatus) according to Embodiment 1. The server 101 acquires, using the training signal acquisition unit 401, one or more training signals used for learning among the training signals acquired from the training signal DB 104 (step S1300).

The server 101 uses the removal information control unit 402 to remove information from the body frame information 320 in the acquired training signal, updates the removed body frame information 320 as the body frame information 320 in the training signal, and sets the names 321 and position information (x coordinate value 322, y coordinate value 323) of the removed body frame points as removal information (step S1301). The training signal subjected to processing by the removal information control unit is referred to as an updated training signal.

The server 101 uses the body frame information processing unit 403 to execute a body frame information process for each updated training signal (step S1302). Specifically, for example, the server 101 executes processes by the joint angle calculation unit 501, the movement amount calculation unit 502, and the normalization unit 503.

Figure 14:
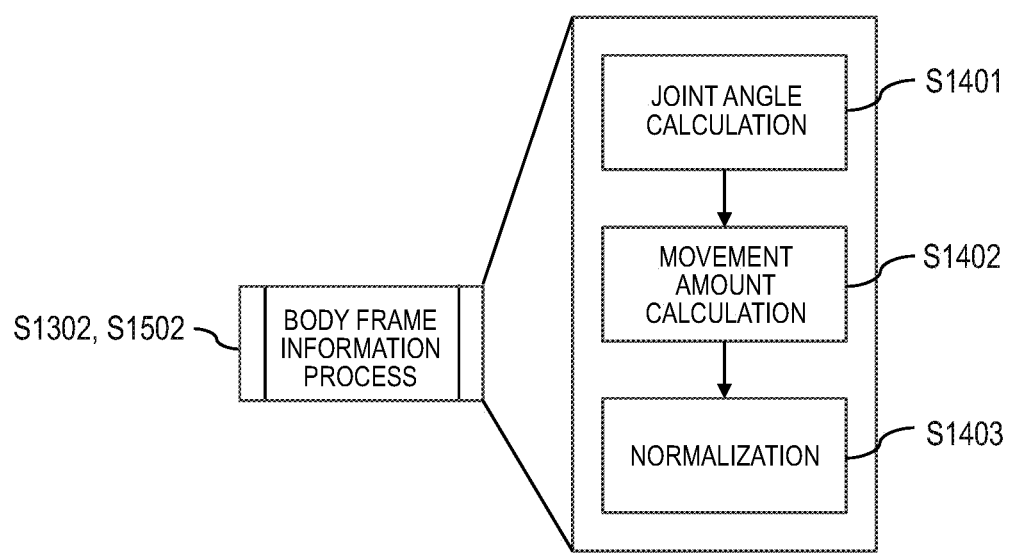
FIG. 14 is a flowchart showing an example of detailed process steps of a body frame information process according to Embodiment 1.

FIG. 14 is a flowchart showing an example of detailed process steps of a body frame information process according to Embodiment 1. The server 101 uses the joint angle calculation unit 501 to calculate the joint angle 370 from the body frame information 320 within the updated training signal for each updated training signal (step S1401). Next, the server 101 uses the movement amount calculation unit 502 to calculate the amount of movement between frames from the body frame information 320 within the updated training signal for each updated training signal (step S1401).

Also, the server 101 uses the normalization unit to eliminate absolute position information from the body frame information 320, and execute normalization such that the size of the body frame information 320 is constant, for each updated training signal (step S1303). As a result, the joint angle 370, the amount of movement between frames, and the normalized body frame information 320 are attained for the updated training signal. Then, the process progresses to step S1303 of FIG. 13.

In FIG. 13, the server 101 uses the principal component analysis unit 404 to execute principal component analysis, with the normalized body frame information 320, the joint angles 370, and the amount of movement between frames as input data, to generate one or more principal components (step S1303).

Next, the server 101 uses the dimension count control unit 405 to determine how many dimensions of principal components used for learning to use in order of highest variance value among the generated principal components, and selects the principal components up to the determined kth dimension (first principal component to kth principal component) in order of highest variance value (step S1304).

Then, the server 101 performs learning using the action learning unit on the basis of the selected principal component and the action information in the updated training signal, and, as a result of learning, generates the action classification model and associates the action classification model with the removal information (step S1305).

In principal component analysis (step S1303), it is possible to generate the same dimension count k of principal components as the information prior to execution thereon of principal component analysis. As a result, in step S1306, the server 101 uses the dimension count control unit 405 to return to step S1304 if there are dimensions of principal components that have yet to be determined in terms of the dimension count k of principal components used in learning determined in step S1304 (step S1306: No), and determines the dimension of the principal component that has yet to be determined (step S1304) On the other hand, if all determinable dimensions of principal components used for learning have been determined (step S1306: Yes), then the process progresses to step S1307. However, the determination of the process of step S1306 is not limited to only determining the next process according to whether or not all determinable dimensions of principal components used for learning have been determined. For example, a process may be adopted in which the number of iterations is set in advance, and the process progresses to step S1307 if step S1304 has been iterated the predetermined number of times.

In step S1307, regarding the body frame information 320 subjected to information removal in step S1301, if there is body frame information 320 for which removal has yet to be performed (step S1307: No), then the process returns to step S1301, and the server 101 performs removal for body frames that have yet to be subjected to the removal process (step S1301).

Meanwhile, if all body frame information 320 has been subjected to the removal process (step S1307: Yes), then the process progresses to step S1308. However, the determination of the process of step S1307 is not limited thereto, and the server 101 may determine whether to return to step S1301 or progress to step S1308 according to a predetermined number of iterations. Alternatively, a configuration may be adopted in which the body frame to be subjected to removal is determined in advance and the server 101 determines whether to return to step S1301 or progress to step S1308 according to whether all predetermined body frames have been subjected to removal.

In step S1308, regarding training signals selected in step S1300, if there are training signals that have yet to be selected (step S1308: No), the server 101 selects training signals that have not yet been selected (step S1300). However, if all training signals have been selected (step S1308: Yes), the server 101 ends the process of action learning. However, the determination of the process of step S1308 is not limited thereto, and the server 101 may determine whether to return to step S1300 or end the process of action learning according to a predetermined number of iterations.

<Action Recognition Process>

Figure 15:
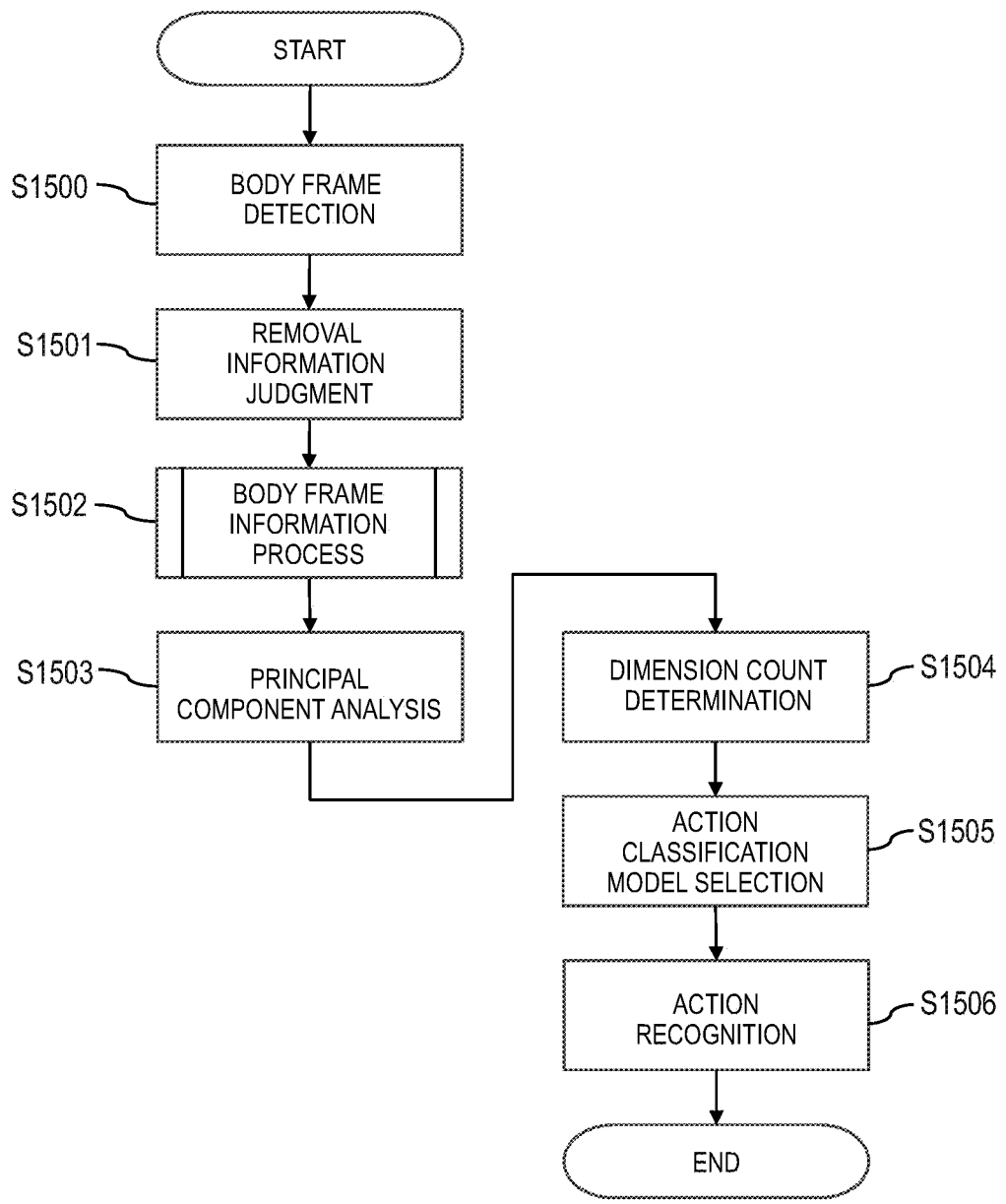
FIG. 15 is a flowchart showing an example of action recognition process steps performed by the client (action recognition apparatus) according to Embodiment 1.

FIG. 15 is a flowchart showing an example of action recognition process steps performed by the client 102 (action recognition apparatus) according to Embodiment 1. The client 102 uses the body frame detection unit 451 to detect the body frame information 320 of a person appearing in to-be-analyzed data acquired from the sensor 103 (step S1500). Next, the client 102 uses the removal information determination unit 452 to determine position information of a body frame point that could not be detected due to occlusion or the like, among the detected body frame information 320, to be removal information (step S1501).

Next, the client 102 uses the body frame information processing unit 453 to execute a body frame information process similar to the process of step S1302 on the body frame information 320 detected in step S1500 (step S1502). Specifically, as shown in FIG. 14, the server 101 executes processes by the joint angle calculation unit 501, the movement amount calculation unit 502, and the normalization unit 503, for example.

Next, the client 102 uses the principal component analysis unit 454 to execute principal component analysis, with the body frame information 320 normalized in step S1502, the joint angles 370, and the amount of movement between frames as input data, to generate one or more principal components, and calculates the contribution ratios and the cumulative contribution ratio in addition to the principal components (step S1503).

Next, the client 102 uses the dimension count decision unit 455 to determine how many principal components to use in order of highest variance among the generated principal components according to the calculated contribution ratios and cumulative contribution ratio (step S1504).

Next, the client 102 uses the action classification model selection unit 456 to select an action classification model with which the same removal information as the removal information detected in step S1501 was associated and that performed action learning for principal components of the same dimension count as the dimension count of the principal component determined in step S1504, among the action classification models generated by action learning (step S1505).

Next, the client 102 uses the action recognition unit 457 to recognize the action of a person appearing in the to-be-analyzed data acquired from the sensor 103 on the basis of the action classification model selected in step S1505 and the principal components (step S1506) The client 102 may transmit the recognition results to the server 101 and may control a device connected to the client 102 using the recognition results.

If, for example, the analysis environment in which the sensor 103 is disposed is a factor, then the action recognition system 100 can be used for monitoring of work performed by workers in the factory, inspecting products for defects, and the like using the recognition results. If the analysis environment is a train, then the action recognition system 100 can be used for monitoring passengers in the train, monitoring equipment in the train, or detecting disasters such as fires using the recognition results.

Thus, according to embodiment 1, it is possible to recognize, at a high accuracy, a plurality of types of actions subject to recognition. In particular, even if some of the body frame points 300 to 317 are removed due to occlusion or the like, it is possible to recognize a plurality of types of actions according to the removed body frame points at a high accuracy.

Embodiment 2

Embodiment 2 will be described with primary focus on differences from Embodiment 1. Components in common with Embodiment 1 are assigned the same reference characters and descriptions thereof will be omitted.

Figure 16:
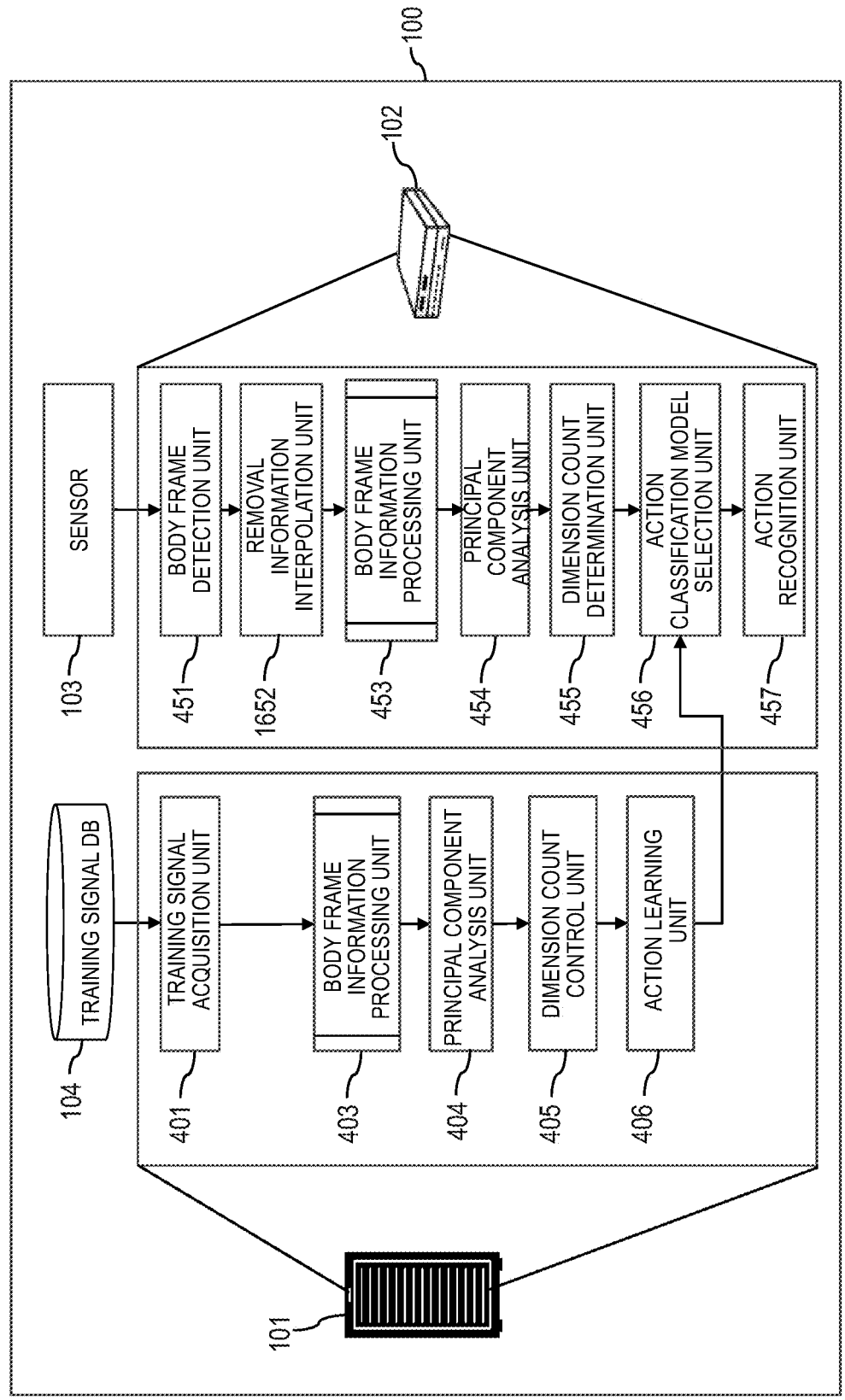
FIG. 16 is a block diagram showing a functional configuration example of the action recognition system according to Embodiment 2.

FIG. 16 is a block diagram showing a functional configuration example of the action recognition system 100 according to Embodiment 2. In Embodiment 2, the removal information control unit 402 is omitted, and a removal information interpolation unit 1652 is used instead of the removal information determination unit 452. As a result, in measuring the position of a person engaging in an activity, if some of the body frame is not measurable due to occlusion or the like and removal information is included, the removal information interpolation unit 1652 interpolates the removal information from the measurable body frame information 320.

Specifically, for example, the removal information interpolation unit 1652 designates position information of body frame points that could not be acquired due to occlusion or the like, among the body frame information 320 acquired from the body frame detection unit 451, as removal information, interpolates the removal information, and outputs the removal information to the body frame information processing unit 453. The removal information interpolation unit 1652 may interpolate the removal information from linked body frame points or body frame points close to the removal information among the acquired body frame information 320, for example.

Also, the removal information interpolation unit 1652 may substitute in predetermined position information for the removal information. Additionally, the removal information interpolation unit 1652 may perform interpolation using removal information of the body frame information 320 determined to include removal information among the body frame information 320 of other frames that had been acquired up to now. Thus, there is no limitation on the interpolation method for the removal information.

<Learning Process>

Figure 17:
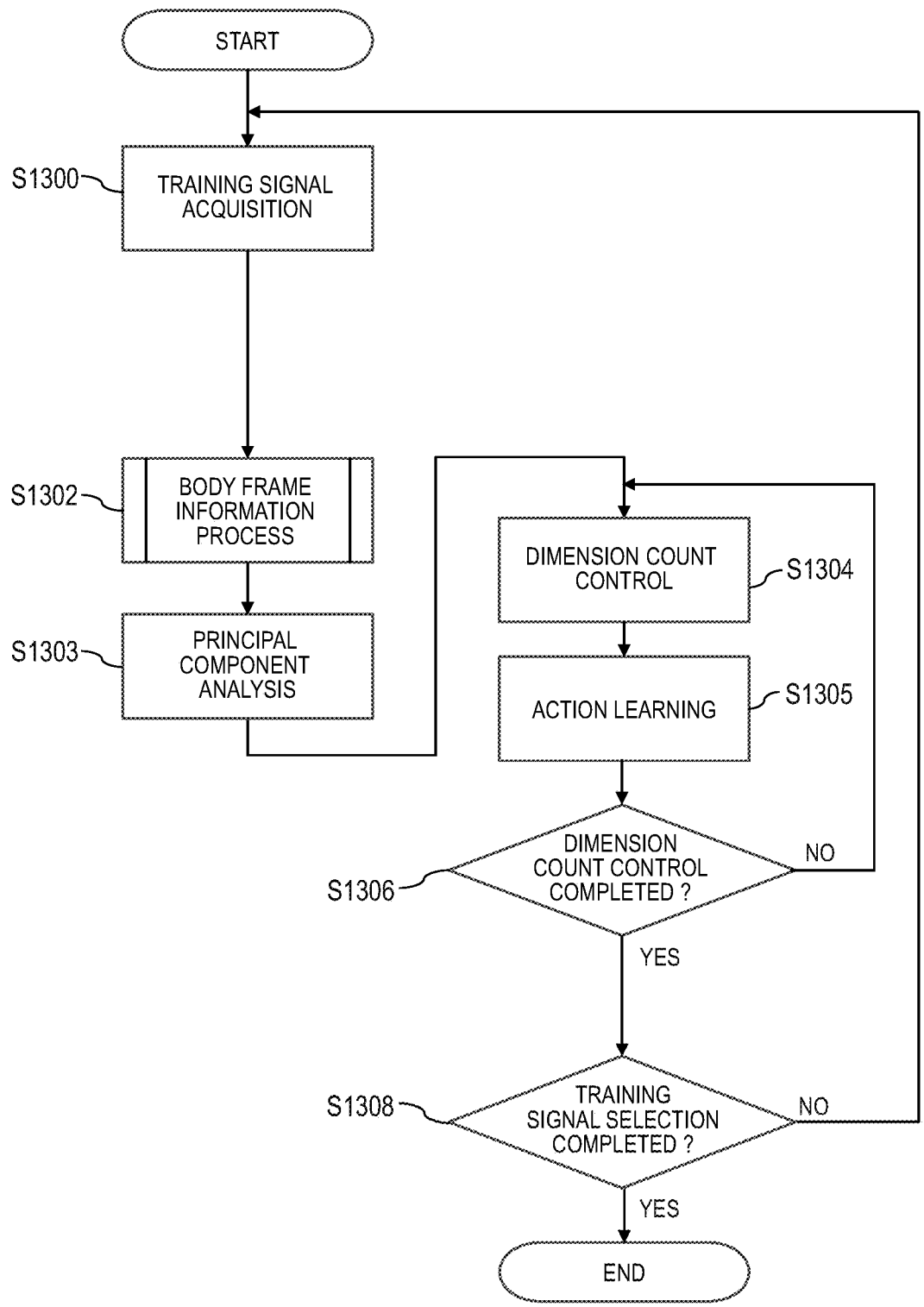
FIG. 17 is a flowchart showing an example of detailed process steps of a learning process performed by the server (learning apparatus) according to Embodiment 2.

FIG. 17 is a flowchart showing an example of detailed process steps of a learning process performed by the server 101 (learning apparatus) according to Embodiment 2. In Embodiment 2, removal information control (step S1301) is not executed, and a body frame information process (step S1302) is executed for the training signal selected in step S1300. That is, in Embodiment 2, regardless of whether or not the body frame points are removed, the action learning unit 406 generates one action classification model without distinguishing body frame information 320.

<Action Recognition Process>

Figure 18:
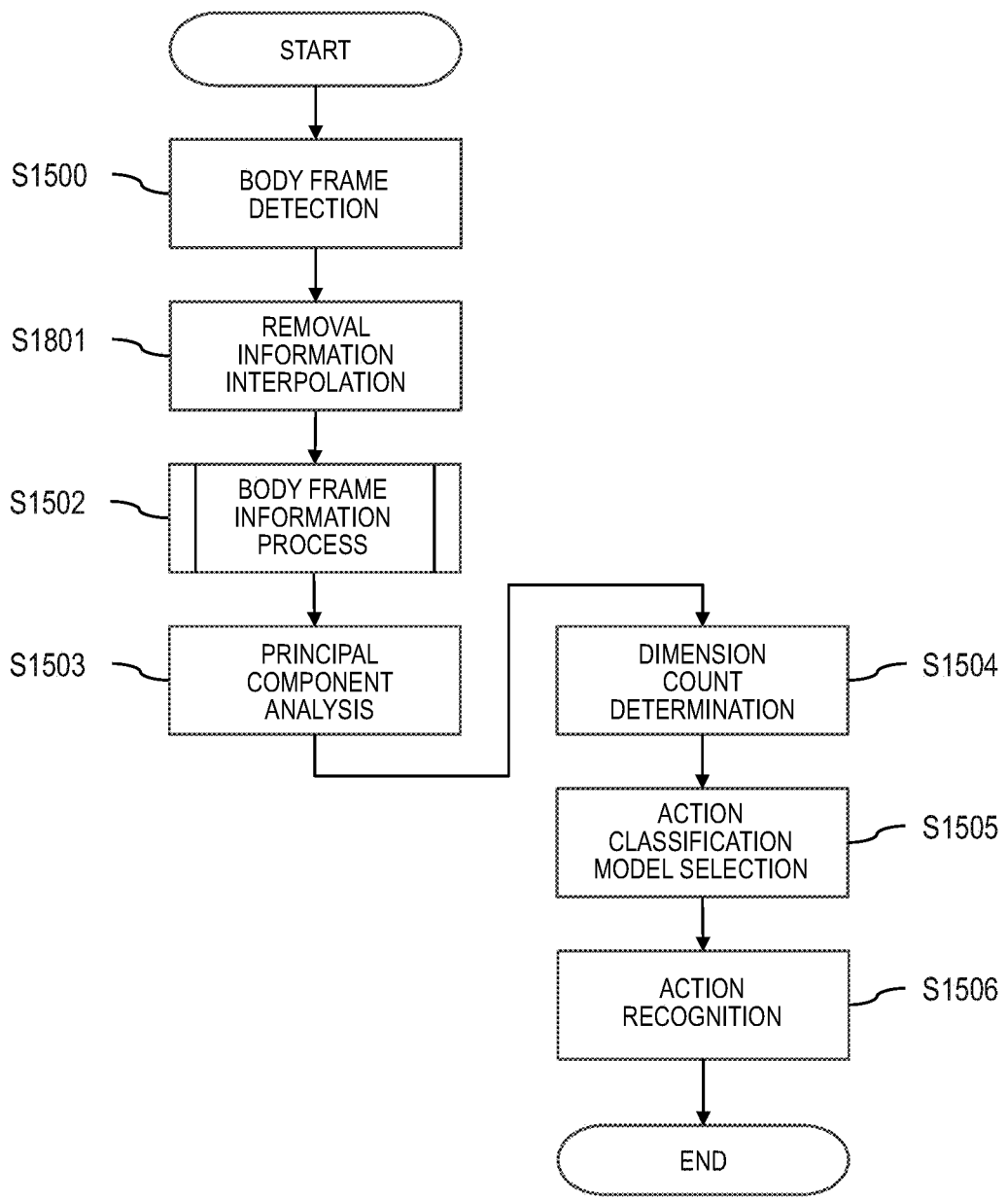
FIG. 18 is a flowchart showing an example of action recognition process steps performed by the client (action recognition apparatus) according to Embodiment 2.

FIG. 18 is a flowchart showing an example of action recognition process steps performed by the client 102 (action recognition apparatus) according to Embodiment 2. In Embodiment 2, removal information interpolation (step S1801) is performed instead of the removal information determination (step S1501). The client 102 interpolates the position information of the body frame points that could not be acquired due to occlusion, among the body frame information 320 detected during body frame detection (step S1500), with the removal information, and updates the interpolated body frame information 320 (step S1801). In the body frame information process (step S1502), a training signal including the interpolated body frame information 320 is used.

Thus, according to Embodiment 2, by interpolating the body frame information 320 with removed information due to occlusion or the like, there is no need to generate an action classification model for each removal information. As a result, it is possible to reduce the processing load of the learning function and to increase the speed of the action recognition function.

Embodiment 3

Embodiment 3 is a combination of Embodiments 1 and 2. Specifically, for example, an action recognition system 100 of Embodiment 3 can be switched through user operation between a first mode in which the learning process and the action recognition process according to Embodiment 1 are executed, and a second mode in which the learning process and the action recognition system of Embodiment 2 are executed.

Thus, according to Embodiment 3, it is possible to attain high accuracy action recognition results by selecting the first mode if considering the removal information, and it is possible to attain action recognition results efficiently by selecting the second mode if interpolating removal information.

Embodiment 4

Figure 19:
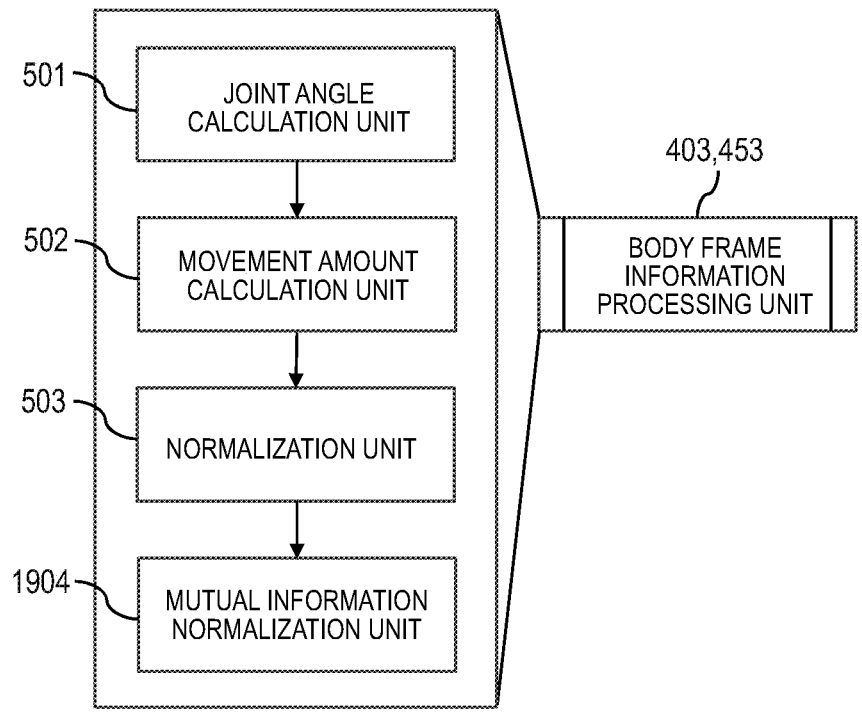
FIG. 19 is a block diagram showing a functional configuration example of body frame information processing units according to Embodiment 4.

Embodiment 4 will be described with primary focus on differences from Embodiments 1 to 3. Components in common with Embodiments 1 to 3 are assigned the same reference characters and descriptions thereof will be omitted. FIG. 19 is a block diagram showing a functional configuration example of body frame information processing units according to Embodiment 4. In Embodiment 4, body frame information processing units 403 and 453 have a mutual information normalization unit 1904. The mutual information normalization unit 1904 normalizes the body frame information 320, the joint angles 370, and the amount of movement between frames outputted to the principal component analysis unit 404 to within a given range of values.

The ranges in the body frame information 320 and the amount of movement between frames depend on the resolution of the to-be-analyzed data. Meanwhile, the values of the joint angle 370 are within a range of 0 to $2\pi$ or 0 to 360 degrees. Regarding the data to be subjected to principal component analysis, if there is a major difference in ranges, then there could be bias according to each data type in the effect of the original data on the principal components.

In order to eliminate this bias, the mutual information normalization unit 1904 executes normalization such that the range of data for the principal components is within a given range. The mutual information normalization unit 1904 sets the ranges of the original data to be uniformly 0 to $2\pi$ according to equations (21) and (22) in the case of the body frame information 320 and equation (23) in the case of amount of movement between frames.

$$\text{norm\_x} = \frac{x_i - \min(X)}{\max(X) - \min(X)} \cdot 2\pi (X \in x_i (i = 0 \sim 17)) \quad (21)$$

$$\text{norm\_y} = \frac{y_i - \min(Y)}{\max(Y) - \min(Y)} \cdot 2\pi (Y \in x_i (i = 0 \sim 17)) \quad (22)$$

$$\text{norm\_dis} = \frac{dis_i - \min(DIS)}{\max(DIS) - \min(DIS)} \cdot 2\pi (DIS \in dis_i (i = 0 \sim 17)) \quad (23)$$

However, the method of normalization executed by the mutual information normalization unit 1904 is not limited thereto, and the mutual information normalization unit 1904 may normalize the range of joint angles 370 to a given range according to the resolution of the data to be subjected to principal component analysis, for example.

Figure 20:
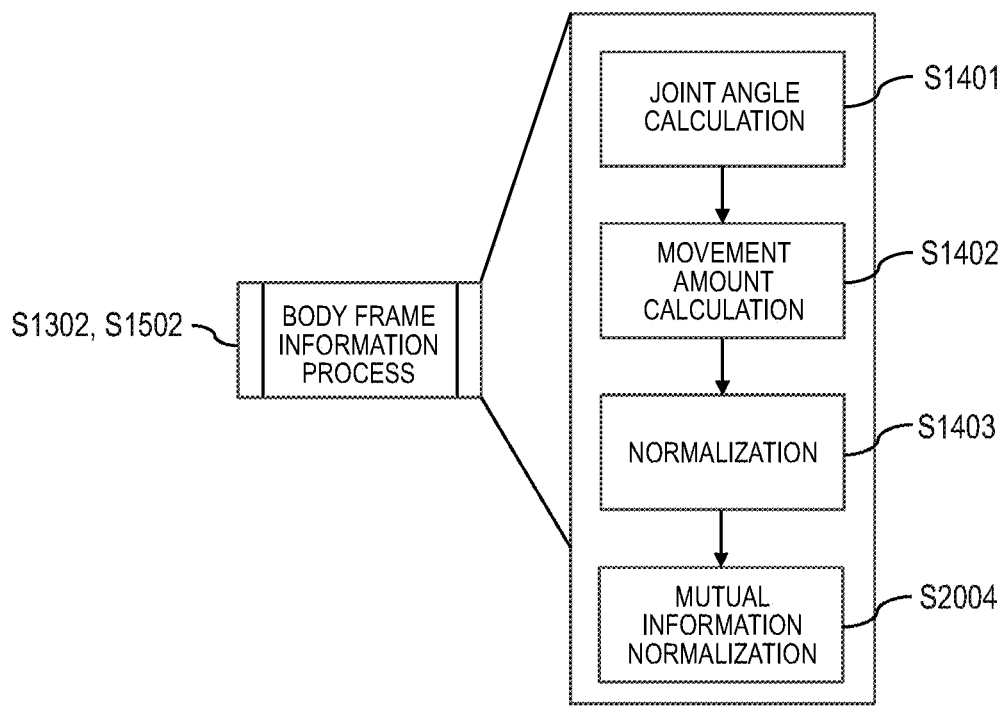
FIG. 20 is a flowchart showing an example of detailed process steps of the body frame information processing units according to Embodiment 4.

FIG. 20 is a flowchart showing an example of detailed process steps of the body frame information processing units according to Embodiment 4. In Embodiment 4, during the body frame information process (steps S1302, S1502), the client 102 executes mutual information normalization (step S2004) after normalization (step S1403). During mutual information normalization (step S2004), the body frame information 320 that was normalized by the normalization unit, the joint angles 370, and the amount of movement between frames are normalized to a given acquirable range.

Thus, according to Embodiment 4, by setting the acquirable range of original data to be subjected to principal component analysis (body frame information 320, joint angles 370, amount of movement between frames) to be uniform, it is possible to eliminate bias in the effect on the principal components of specific data having a wide range, and to distinguish between a plurality of types of actions at high accuracy.

Embodiment 5

Embodiment 5 will be described with primary focus on differences from Embodiments 1 to 4. Components in common with Embodiments 1 to 4 are assigned the same reference characters and descriptions thereof will be omitted.

Figure 21:
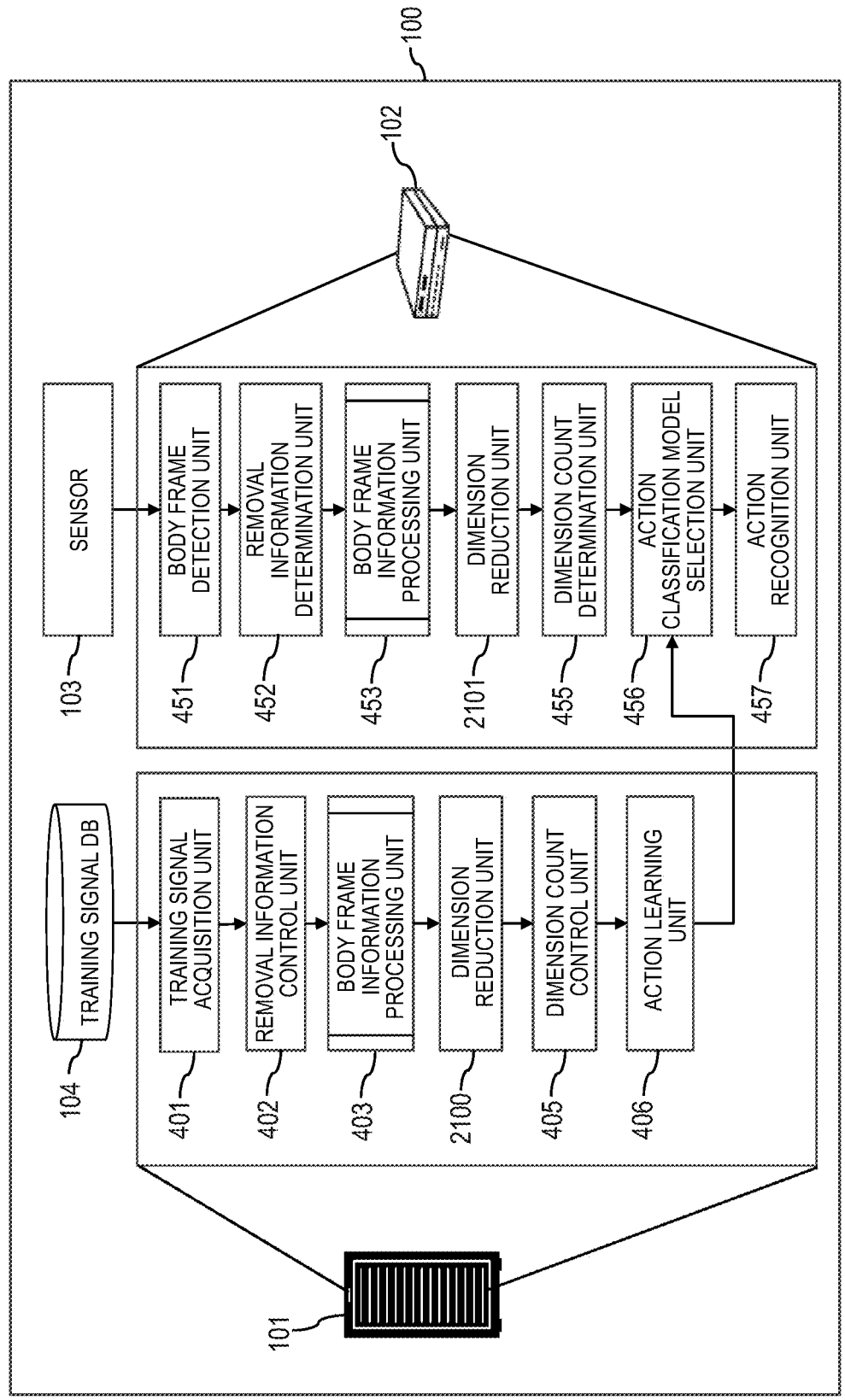
FIG. 21 is a block diagram showing a functional configuration example of the action recognition system according to Embodiment 5.

FIG. 21 is a block diagram showing a functional configuration example of the action recognition system 100 according to Embodiment 5. In Embodiment 5, the principal component analysis unit 404 and the principal component analysis unit 445 are replaced by a dimension reduction unit 2100 and a dimension reduction unit 2101. Dimension reduction is a process for reducing the original variable count or the original dimension count while maintaining the original amount of information to the greatest extent possible, and is a concept that encompasses component analysis such as principal component analysis and independent component analysis of Embodiments 1 to 4.

The dimension reduction unit 2100 uses, as input data, the normalized body frame information 320, the joint angles 370, and the amount of movement between frames, in the training signal acquired from the body frame information processing unit 403, to execute dimension reduction and generate one or more variables, and outputs the variables to the dimension count control unit 405.

Methods for dimension reduction executed by the dimension reduction unit 2100 include stochastic neighbor embedding (SNE), t-distributed stochastic neighbor embedding (t-SNE), uniform manifold approximation and projection (UMAP), Isomap, locally linear embedding (LLE), Laplacian eigenmaps, LargeVis, and diffusion maps. The dimension reduction unit 2100 may perform dimension reduction by combining principal component analysis and independent component analysis with t-SNE and UMAP. Below, each method of dimension reduction and a dimension reduction method in which the methods are combined will be described.

The process of SNE will be described with reference to equations (24) to (28).

$$p_{j|i} = \frac{\exp\left(\frac{-\|x_i - x_j\|^2}{2\sigma_i^2}\right)}{\sum_{k \neq i} \exp\left(\frac{-\|x_i - x_k\|^2}{2\sigma_i^2}\right)} \quad (24)$$

$$q_{j|i} = \frac{\exp(-\|y_i - y_j\|^2)}{\sum_{k \neq i} \exp(-\|y_i - y_k\|^2)} \quad (25)$$

$$C = \sum_i KL(P_i \| Q_i) = \sum_i \sum_j p_{j|i} \log \frac{p_{j|i}}{q_{j|i}} \quad (26)$$

$$\frac{\partial C}{\partial y_i} = 2 \sum_j (p_{j|i} - q_{j|i} + p_{i|j} - q_{i|j})(y_i - y_j) \quad (27)$$

-continued $$Y^{(t)} = Y^{(t-1)} + \eta \frac{\partial C}{\partial Y} + \alpha(t)(Y^{(t-1)} - Y^{(t-2)}) \qquad (28)$$

The degree of similarity between the two x coordinate values 322 (input data) xi and xj is indicated as a conditional probability pj|i of selecting xj as a neighboring value when xi is given. The conditional probability pj|i is indicated in equation (24). At this time, it is assumed that xj is selected on the basis of a normal distribution centered on xi. Next, the degree of similarity between the two y coordinate values 323 (principal components) yi and yj after dimension reduction are, similar to the degree of similarity between xi and xj prior to dimension reduction, set as a conditional probability qj|i indicated in equation (25). Note that the variance in coordinate values after dimension reduction is fixed at $1/\sqrt{2}$ in order to simplify the equations.

If y is generated through dimension reduction so as to maintain the distance relationship prior to and after dimension reduction, it is possible to reduce the dimensions while maintaining the amount of information to the greatest extent possible. In order to perform dimension reduction while mitigating a reduction in the amount of information, the dimension reduction unit 2100 performs a process such that pj|i=qj|i. A KL divergence, which is a measure representing the degree to which two probability distributions are similar, is used for dimension reduction.

With the KL divergence as the loss function, an equation that adapts the probability distributions prior to and after dimension reduction is indicated in equation (26). The dimension reduction unit 2100 causes equation (26) that is the loss function to reach a minimum through stochastic gradient descent. This gradient causes yi to fluctuate using equation (27) in which the differential of the loss function is taken with respect to yi. The updated equation when performing such fluctuation is indicated in equation (28).

Thus, equation (28) is updated while causing yi to fluctuate, and dimension reduction is performed by attaining a value of yi by which equation (27) is at a minimum, thereby attaining a new variable. However, unlike with principal component analysis, in the case of SNE, there are two or three types of dimension counts (variables) after contraction due to the characteristics of the process. Thus, in reducing dimensions by SNE, a predetermined dimension count (variable) is outputted to the dimension count control unit 405, and the dimension count control unit 405 determines the number of variables to use according to the predetermined dimension count.

However, with SNE, it is difficult to achieve a minimum for the loss function, and there is the additional problem that the body frame points specified by the x coordinate values 322 and the y coordinate value 323 become too dense as a result of attempts to maintain equal distance therebetween during dimension reduction. A solution to this problem is t-SNE.

The process of t-SNE will be described with reference to equations (29) to (33).

$$p_{ij} = \frac{p_{i|j} + p_{j|i}}{2n} \qquad (29)$$

$$p_{j|i} = \frac{\exp\left(\frac{-\|x_i - x_j\|^2}{2\sigma_i^2}\right)}{\sum_{k \neq i} \exp\left(\frac{-\|x_i - x_k\|^2}{2\sigma_i^2}\right)} \qquad (30)$$

$$q_{ij} = \frac{(1 + \|y_i - y_j\|^2)^{-1}}{\sum_{k \neq i}(1 + \|y_i - y_j\|^2)^{-1}} \qquad (31)$$

$$C = \sum_i KL(P\|Q) = \sum_i \sum_j p_{ij} \log \frac{p_{ij}}{q_{ij}} \qquad (32)$$

$$\frac{\partial C}{\partial y_i} = 4 \sum_j (p_{ji} - q_{ji})(y_i - y_j)(1 + \|y_i - y_j\|^2)^{-1} \qquad (33)$$

In order to make it easy to allow the loss function to reach a minimum, the loss function is symmetrized. In the symmetrization process for the loss function, as indicated in equation (29), the distance between xi and xj is represented by a joint probability distribution pij. Similar to equation (24), pj|i can be indicated by equation (30). The distance between yi and yj after dimension reduction is represented by the joint probability distribution qij indicated by equation (31).

The distance between the points after dimension reduction is assumed to match a Student's t-distribution. The Student's t-distribution is characterized by having a higher existence probability for values offset from an average value compared to a normal distribution, and this characteristic allows for distributions with long distances between data points after dimension reduction.

In t-SNE, the dimension reduction unit 2100 uses pij and qij determined in equations (29) to (31) to perform dimension reduction to cause the loss function indicated in equation (32) to reach a minimum. The dimension reduction unit 2100 employs the stochastic gradient descent indicated in equation (33) to cause the loss function to reach a minimum, similar to SNE.

Thus, as a result of attaining a value for yi by which equation (33) reaches a minimum, the dimension reduction unit 2100 can perform dimension reduction and attain a new variable. In the case of t-SNE, similar to SNE, there are two or three types of dimension counts (variables) after contraction due to the characteristics of the process. Thus, in reducing dimensions by t-SNE, a predetermined dimension count (variable) is outputted to the dimension count control unit 405, and the dimension count control unit 405 determines the number of variables to use according to the predetermined dimension count.

In t-SNE, it is possible to reduce the dimensions accurately by attaining a comprehensive structure to the greatest extent possible while maintaining a local high-dimension structure prior to dimension reduction, but t-SNE has the problem that the amount of time required for calculation increases in proportion to the dimension count prior to dimension reduction. UMAP is a method that solves this problem regarding calculation time for dimension reduction. The process of UMAP will be described with reference to equations (34) to (36).

$$X = \{x_1, x_2, \ldots, x_m \in \mathbb{R}^m\} \qquad (34\text{-}1)$$

$$Y = \{y_1, y_2, \ldots, y_p \in \mathbb{R}^p; p < m\} \qquad (34\text{-}2)$$

$$C((A, \mu), (A, \nu)) = \sum_{a \in A} \left[\mu(a) \log \frac{\mu(a)}{\nu(a)} + (1 - \mu(a)) \log \frac{1 - \mu(a)}{1 - \nu(a)}\right] \qquad (34\text{-}3)$$

Among all attainable values A, there is a high-dimension set X (equation (34-1)). In extracting a given piece of data from among A, a membership function that outputs the degree to which the data is included in the set X from a range of 0 to 1 is designated as p. Y indicated in equation (2) is prepared for an input X shown in equation (1). Y is a set of m (<p) points present in a lower dimension space compared to X, and is a set of data subjected to dimension reduction. Where a membership function of Y is v, the dimension reduction unit 2100 performs dimension reduction by setting Y such that equation (36) reaches a minimum, and a new variable is attained.

If performing dimension reduction by UMAP, the dimension reduction unit 2100 may output a predetermined dimension count (variable) to the dimension count control unit 405 in a manner similar to SNE or t-SNE, or may output a dimension count (variable) that allows for the membership function v after dimension reduction to be a predetermined value or greater as a necessary dimension count to the dimension count control unit 405. In this case, the dimension count control unit 405 would determine the dimension count to be used (number of variables) according to the dimension count (variable) outputted by the dimension reduction unit 2100.

The Isomap process will be described next. The dimension reduction unit 2100 calculates the shortest distance to neighboring data of a given piece of data, performs dimension reduction by representing the calculated distance as a geodesic distance matrix by multidimensional scaling (MDS), thereby attaining a new variable. In reducing dimensions by Isomap, the dimension reduction unit 2100 outputs a predetermined dimension count (variable) to the dimension count control unit 405, and determines the number of variables to use according to the predetermined dimension count.

LLE will be described with reference to equations (35) to (41).

$$x_i \approx \sum_{j=1}^{m} W_{ij} x_j \quad (35)$$

$$\sum_{j \in U_i} W_{ij} = 1 \quad (36)$$

$$C(x) = \left\| x_i - \sum_{j \in U_i} W_{ij} x_j \right\|^2 \quad (37)$$

$$C(y) = \sum_{i=1}^{N} \left\| y_i - \sum_{j \in U_i} W_{ij} y_j \right\|^2 \quad (38)$$

$$(I-W)^T(I-W) \quad (39)$$

$$V=(v_1, \ldots, v_d) \quad (40)$$

$$y_i = V_i^T \quad (41)$$

Points neighboring xi are represented by equation (35) through linear combination. Here, by achieving a minimum for equation (37) through the condition of equation (36), a value close to xi prior to dimension reduction is determined. Next, regarding yi subjected to dimension reduction, the dimension reduction unit 2100 achieves a minimum value for equation (38) in order to maintain linear adjacency to xi to the greatest degree possible even after dimension reduction. The solution is attained according to equation (40) by extracting the eigenvector of equation (39) from the second smallest eigenvalue vi to the (d+1)th eigenvalue vd, and the dimension reduction unit 2100 attains the yi after dimension reduction according to equation (41).

In reducing dimensions by LLE, the dimension reduction unit 2100 outputs a predetermined dimension count (variable) to the dimension count control unit 405, and the dimension count control unit 405 determines the number of variables to use according to the predetermined dimension count.

The process of Laplacian eigenmaps will be described with reference to equations (42) to (47).

$$W_{ij}=1 \quad (42)$$

$$\exp\left(-\frac{\|x_i - x_j\|^2}{\sigma}\right) \quad (43)$$

$$L = D - W\left(D_{ii} = \sum_{j=1}^{n} W_{ij}, D_{ij} = 0(i \neq j)\right) \quad (44)$$

$$Lv=\lambda Dv \quad (45)$$

$$V=(v_1, \ldots, v_d) \quad (46)$$

$$y_i = V_i^T \quad (47)$$

The sides xixj of a neighborhood graph generated by data prior to dimension reduction are allocated to equation (42) or (43). The graph Laplacian of equation (44) is derived in relation to the allocated weight, and the eigenvector (equation (45)) of the graph Laplacian is attained according to equation (46) by extracting the second smallest eigenvalue vi to the (d+1)th eigenvalue vd, and the dimension reduction unit 2100 attains the value yi after dimension reduction according to equation (47).

In reducing dimensions by Laplacian eigenmaps, the dimension reduction unit 2100 outputs a predetermined dimension count (variable) to the dimension count control unit 405, and the dimension count control unit 405 determines the number of variables to use according to the predetermined dimension count.

The LargeVis process will be described next. LargeVis is a method by which the calculation time of t-SNE is improved. In t-SNE, the distance between data points is determined, and thus, the calculation time increases according to the number of pieces of data. In LargeVis, the dimension reduction unit 2100 divides the data into regions using a K-NN graph from neighboring data, and performs dimension reduction according to a similar method to t-SNE for each data model of each region.

In reducing dimensions by LargeVis, the dimension count control unit 405 outputs a predetermined dimension count (variable) to the dimension count control unit 405, and determines the number of variables to use according to the predetermined dimension count.

Diffusion maps will be described with reference to equations (48) to (53).

$$P_{ij} = p_{1(x_i, x_j)} = \frac{W_{ij}}{D_{ii}} \quad (48)$$

$$D_t(x_i, x_j)^2 = \sum_{k=1}^{N} \left(\frac{\left(p_{t(x_i, x_k)} - p_{t(x_j, x_k)}\right)^2}{\phi_0(x_k)}\right) \quad (49)$$

$$P\psi_i = \lambda_i \psi_i \quad (50)$$

$$1=|\lambda_0|\geq|\lambda_1|\geq \ldots \geq|\lambda_{N-1}|\geq 0 \quad (51)$$

$$D_t^2(x_i, x_j) = \sum_{k=1}^{N}(\lambda_k^{2t}(\psi_k(x_i) - \psi_k(x_j))^2) \quad (52)$$

$$y_i = \Psi_t(x_i) = (\lambda_1{}^t\psi_1(x_1), \ldots, \lambda_{d(t)}{}^t\psi_{d(t)}(x_i))^T \quad (53)$$

A weight Wij is allocated to each side xixj of the neighborhood graph formed from xj, which neighbors xi prior to dimension reduction, and by normalizing these values, a N×N transition probability matrix P indicated by equation (48) is created. Where pt(xixj) represents the probability that after a t-step from xi through a random walk on a graph represented by P, xj is reached, then according to the properties of a transition matrix, pt(xixj) converges on a stationary distribution φ0 (xj) at t→∞. At this point, the diffusion distance of a point xixj is defined by equation (49). Where the eigenvalue of the transition probability matrix P is defined by equation (50) and the eigenvector is defined by equation (51), equation (52) is satisfied. The absolute value of λi is 1 or less, and thus, the dimension reduction unit 2100 takes the eigenvalue up to a suitable dimension d(t) that is less than N, performs dimension reduction according to equation (53), and attains a new variable.

In reducing dimensions by a diffusion map, a predetermined dimension count (variable) is outputted to the dimension count control unit 405, and the dimension count control unit 405 determines the number of variables to use according to the predetermined dimension count.

The dimension reduction unit 2100 may perform dimension reduction by combining principal component analysis, independent component analysis, t-SNE, UMAP, Isomap, LLE, Laplacian eigenmap, LargeVis, diffusion map, and the like. There is no limitation to the combination of methods used for dimension reduction: for example, for high-dimension data having 36 dimensions or 36 variables, the dimension reduction unit 2100 could perform principal component analysis for dimension reduction up to the 10th dimension and then perform UMAP for dimension reduction for the next two dimensions. By combining various methods in performing dimension reduction, multiple effects in performance and calculation time can be anticipated.

Also, the methods for dimension reduction are not limited to the scope disclosed in Embodiment 5, and as an example, addition, subtraction, multiplication, and division may simply be performed on the high-dimension information, or convolution may be performed thereon according to a predetermined coefficient. As long as the method involves generating low-dimension data or a small number of variables from high-dimension data or multiple variables as in the method disclosed in Embodiment 5, there is no limitation on the method for dimension reduction.

The dimension reduction unit 2101 has a similar function to the dimension reduction unit 2100. The dimension reduction unit 2101 executes a similar process to the dimension reduction unit 2100 on the output data from the body frame information processing unit 453, and generates a small number of individual or multiple new variables compared to before dimension reduction. Also, the principal component analysis unit 454 outputs, to the dimension count decision unit 455, the contribution ratio and the cumulative contribution ratio generated together with the principal components.

The dimension reduction unit 2101 has a similar function to the dimension reduction unit 2100. The dimension reduction unit 2101 executes a similar process to the dimension reduction unit 2100 on the output data from the body frame information processing unit 453 and generates individual or multiple new variables. Also, the dimension reduction unit 2101 outputs information regarding the dimension count (variable) necessary for the dimension count decision unit 455 along with the new variables to the dimension count decision unit 455 by a similar method to the dimension reduction unit 2100.

The dimension count decision unit 455 determines a dimension count k indicating how many of the acquired variables to output to the action classification model selection unit 456 on the basis of the acquired dimension count (variable), and outputs a determined number of newly generated variables to the action classification model selection unit 456.

In this manner, according to Embodiment 5, by changing the method for dimension reduction, it is possible to perform dimension reduction effectively or with a shortened calculation time according to the data acquired from the body frame information processing unit 403, and it is possible to distinguish complex actions at a high accuracy.

Embodiment 6

Embodiment 6 will be described with primary focus on differences from Embodiments 1 to 5. Components in common with Embodiments 1 to 5 are assigned the same reference characters and descriptions thereof will be omitted.

Figure 22:
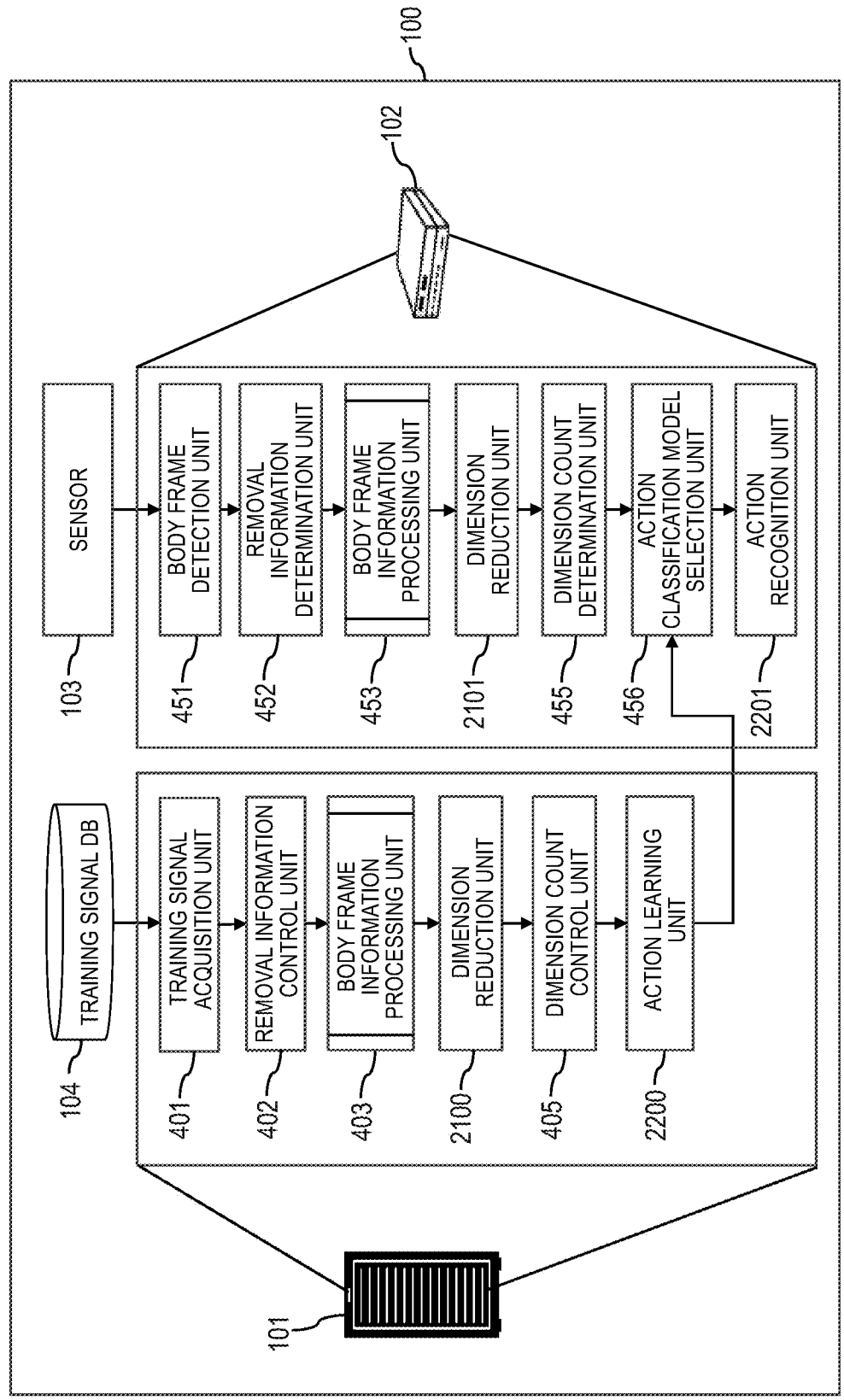
FIG. 22 is a block diagram showing a functional configuration example of the action recognition system according to Embodiment 6.

FIG. 22 is a block diagram showing a functional configuration example of the action recognition system 100 according to Embodiment 6. In Embodiment 6, the action learning unit 406 and the action recognition unit 457 are replaced by an action learning unit 2200 and an action recognition unit 2201. A detailed method in which the action learning unit 2200 and the action recognition unit 2201 classify will be explained with reference to FIGS. 23 to 25.

Figure 23:
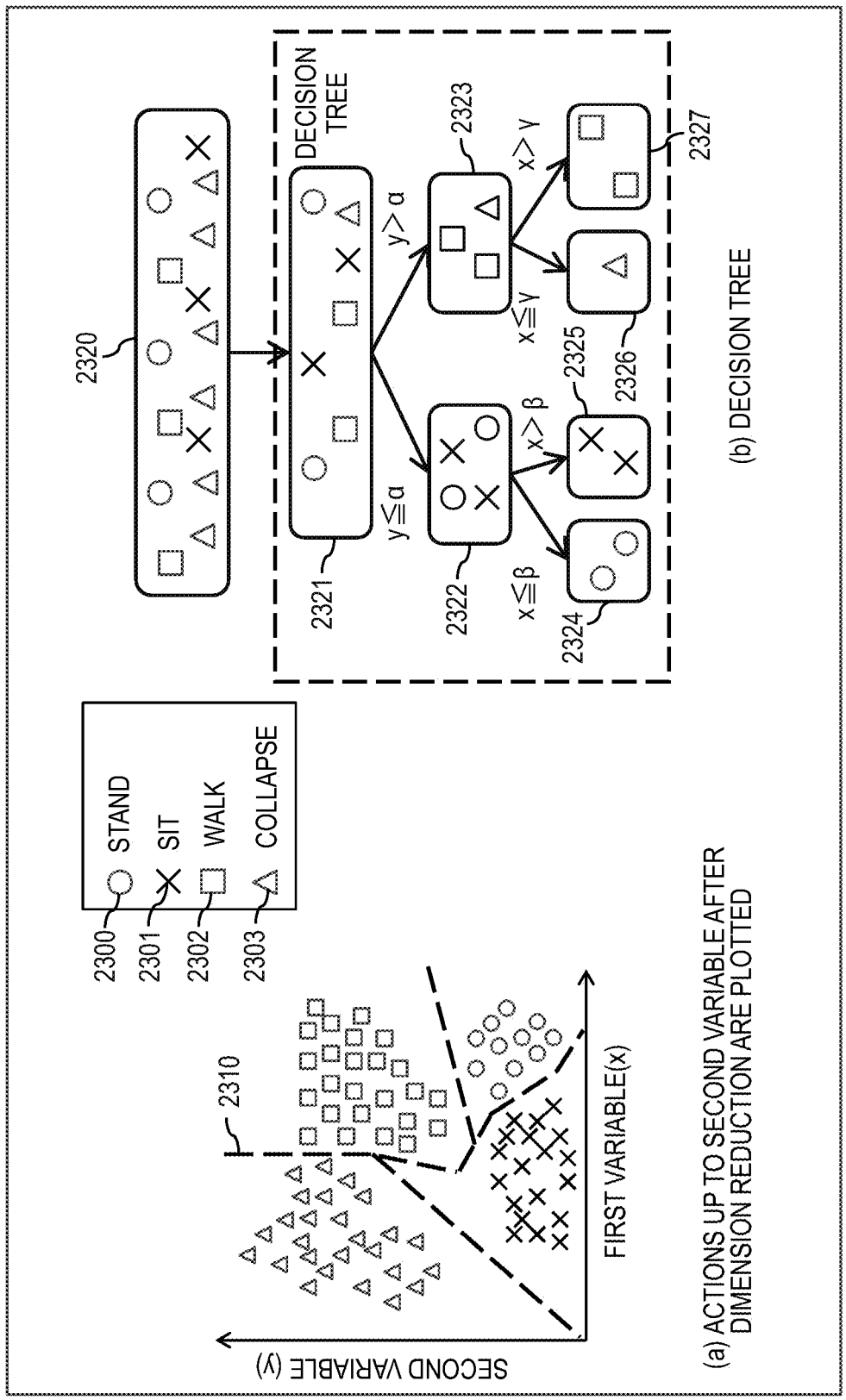
FIG. 23 is a descriptive view showing a decision tree, which is a basic method used by the action learning unit and the action recognition unit to classify the actions.

FIG. 23 is a descriptive view showing a decision tree, which is a basic method used by the action learning unit 2200 and the action recognition unit 2201 to classify the actions. An action classification method using the decision tree will be explained. In the decision tree, (a) boundary lines 2310 are generated using variables 2300 to 2030 each given a type of action in advance, for each action in the variable space newly generated after the dimension reduction.

A method to generate (a) border line 2310 will be explained. The decision tree classifies actions through multiple phases so that the degree of impurity of the input variable group 2321 is minimized. In the first phase, actions are classified into a variable group 2322 and a variable group 2323 on the second variable axis, and in the second phase, the variable group 2322 and the variable group 2323 are classified into variable groups 2324 to 2327. In this way, (a) boundary lines 2310 are generated using the discriminant obtained through the process of classifying the actions so that the degree of impurity is minimized. There is no limitation on the axis to be used to classify the actions in each phase, and the number of classifications that take place on each axis is not limited to one time, or any other times.

Figure 24:
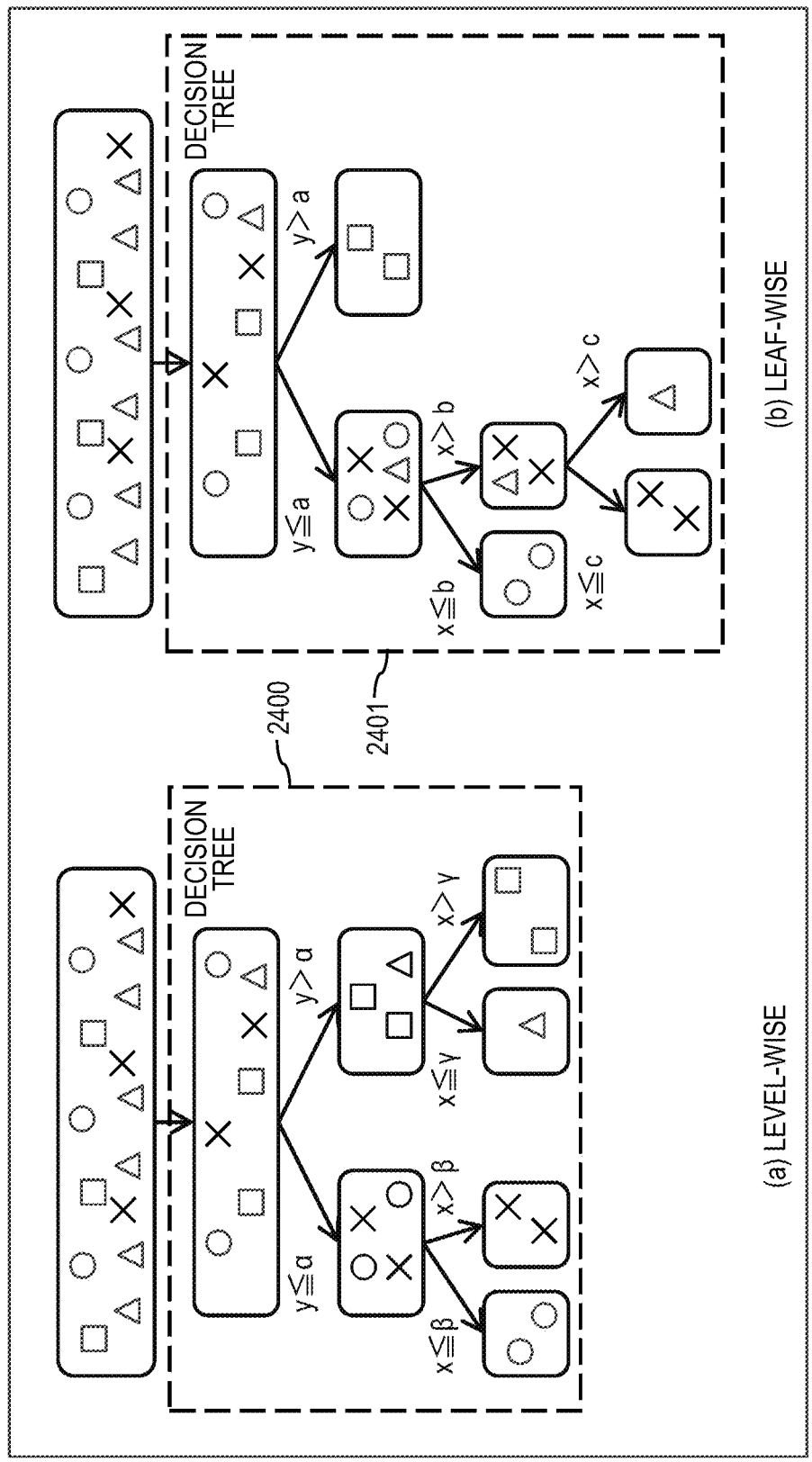
FIG. 24 is a descriptive view showing a detailed development method of classification by the decision tree.

FIG. 24 is a descriptive view showing a detailed development method of classification by the decision tree. The decision tree has two types: a level-wise decision tree 2400 that grows by level (depth); and a leaf-wise decision tree 2401 that grows by leaf (data group after splitting). Learning through multiple classifiers such as the decision tree is referred to as ensemble learning.

Figure 25:
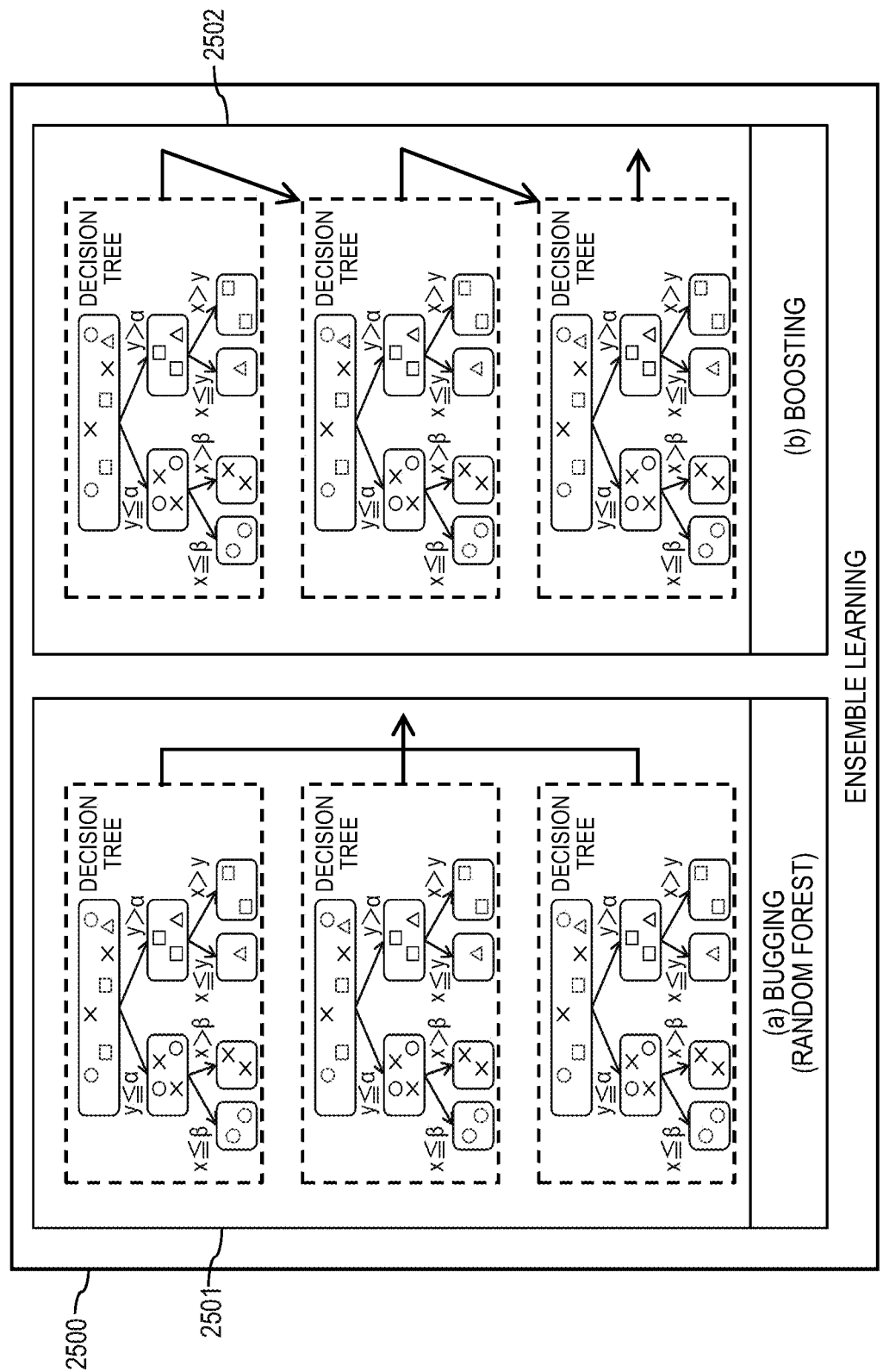
FIG. 25 is a descriptive view showing the ensemble learning and a detailed method used by the action learning unit and the action recognition unit 2201 to classify actions.

FIG. 25 is a descriptive view showing the ensemble learning and a detailed method used by the action learning unit 2200 and the action recognition unit 2201 to classify actions. The ensemble learning includes bagging 2401 in which classifiers such as the decision tree are used in parallel, and boosting 2402 in which new learning results are built on the previous learning results. The random forest of Embodiment 1 is a method employing bagging 2401 for the decision tree, and the method using the action learning unit 2200 and the action recognition unit 2201 in Embodiment 6 is a classification method using boosting 2402.

In action learning by the action learning unit 2200 and action classification by the action recognition unit 2201, variables to be classified may be input by boosting where each decision tree is grown level-wise and a plurality of decision trees are combined, or variables to be classified may be input by boosting where each decision tree is grown leaf-wise and a plurality of decision tree are combined.

If boosting where each decision tree is grown level-wise and a plurality of decision trees are combined is employed for the action classification method, boosting may be implemented using the software library xgboost. On the other hand, if boosting where each decision tree is grown leaf-wise and a plurality of decision trees are combined is employed for the action classification method, boosting may be implemented using the software library LightGBM. However, the implementation method is not limited to those.

In this manner, according to Embodiment 6, by using boosting for the action classification method and by combining multiple decision trees, it is possible to distinguish complex actions at a high accuracy.

Embodiment 7

Embodiment 7 will be described with primary focus on differences from Embodiments 1 to 6. Components in common with Embodiments 1 to 6 are assigned the same reference characters and descriptions thereof will be omitted.

Figure 26:
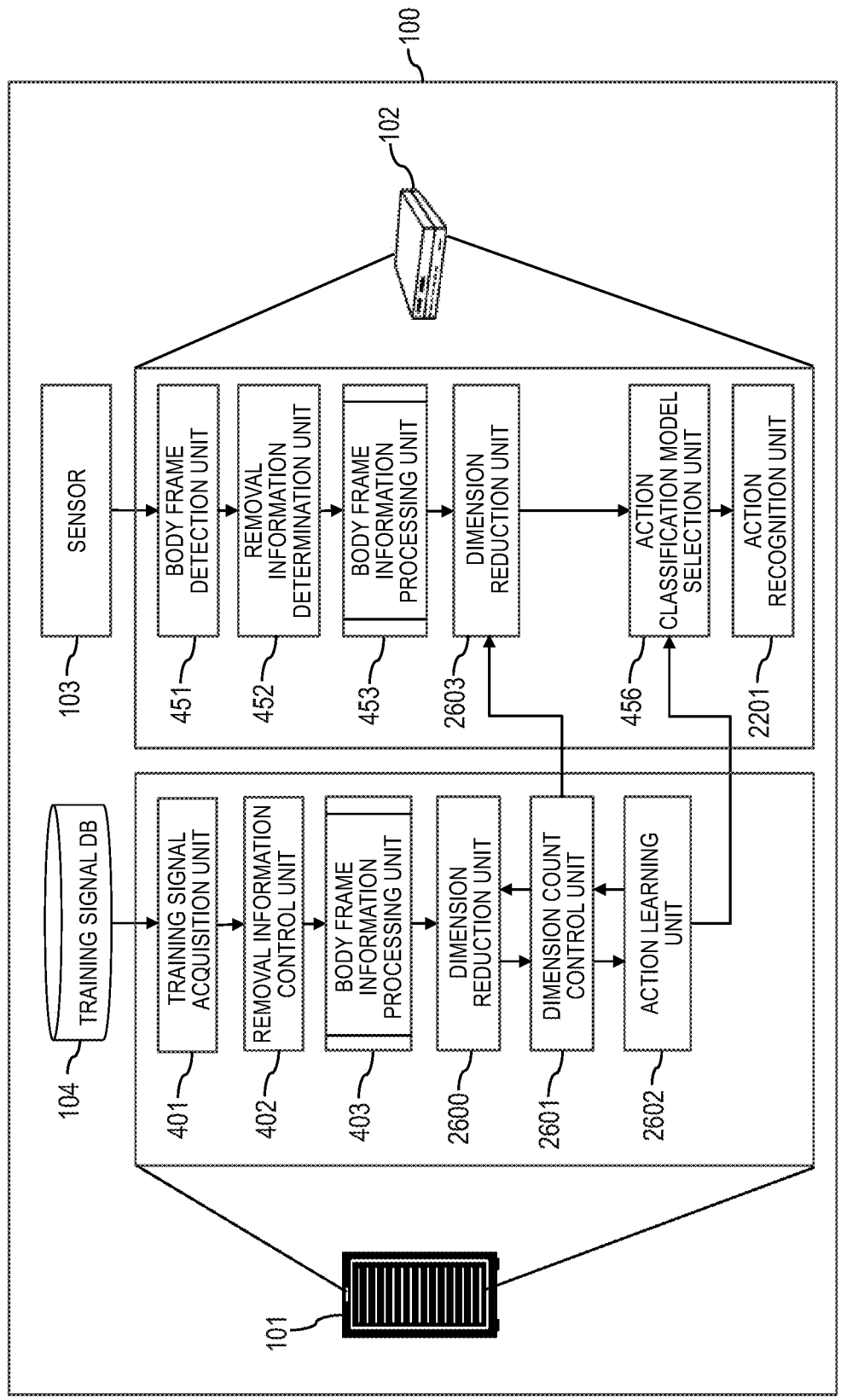
FIG. 26 is a block diagram showing a functional configuration example of the action recognition system according to Embodiment 7.

FIG. 26 is a block diagram showing a functional configuration example of the action recognition system 100 according to Embodiment 7. In Embodiment 7, the dimension reduction unit 2100, the dimension count control unit 405, the action learning unit 406, and the dimension count decision unit 455 are replaced by a dimension reduction unit 2600, a dimension count control unit 2601, an action learning unit 2602, and a dimension reduction unit 2603.

The dimension reduction unit 2600 performs dimension reduction using any one of the methods of Embodiments 1 to 6, in accordance with the predetermined dimension count, and outputs a new variable generated after the dimension reduction to the dimension count control unit 2601. On the basis of the acquired dimension count, the dimension count control unit 2601 outputs the variable after the dimension reduction to the action learning unit 2602.

The action learning unit 2602 generates boundary lines for action classification through machine learning on the basis of the acquired variable after dimension reduction and given action types, and generates an action classification model. At this time, an action classification accuracy indicating how accurately actions can be predicated is calculated for the generated action classification model.

The action learning unit 2602 may calculate the action classification accuracy using the variables used for generating the action classification model. Alternatively, the action learning unit 2602 may save some of the variables acquired from the dimension reduction unit 2600, instead of using all of the variables for generating the action classification model, and calculate the action classification accuracy using variables that were not used for generating the action classification. However, the method for calculating the action classification accuracy is not limited to those. If the calculated action classification accuracy is higher than a prescribed accuracy, the action learning unit 2602 outputs the generated action classification model to the action classification model selection unit 456. At this time, the action learning unit 2602 outputs, to the dimension count control unit 2601, the acquired dimension count and the fact that the action classification accuracy was acceptable.

On the other hand, if the calculated action classification accuracy is lower than the prescribed accuracy, the action learning unit 2602 outputs, to the dimension count control unit 2601, the fact that the action classification accuracy was not acceptable. However, if the action classification model was generated for all of the configurable dimension counts (variables), and if the action classification accuracy was not acceptable for all of the models, the action learning unit 2602 outputs, to the action classification model selection unit 456, the action classification model with the highest action classification accuracy among the action classification models that have been generated, and outputs the dimension count (variable) used for the output to the dimension count control unit 2601 together with the learning completion information.

In accordance with the pass/fail information and the learning completion information output from the action learning unit 2602, the dimension count control unit 2601 outputs the acquired dimension count information to the dimension reduction unit 2603 if the accuracy was acceptable or the learning completion information was received, or outputs to the dimension reduction unit 2600 a dimension reduction command so that the dimension reduction is performed again with an updated dimension count if the accuracy was not acceptable.

The dimension reduction unit 2600 updates the dimension count to a new dimension count in accordance with the acquired dimension reduction command, and outputs the generated variable to the dimension count control unit 2601.

The dimension reduction unit 2603 performs dimension reduction using the dimension reduction methods of Embodiments 1 to 6 on the data acquired from the body frame information processing unit 452 in accordance with the dimension count (variable) acquired from the dimension count control unit 2601, and outputs the generated variable to the action classification model selection unit 456. Instead of specifying the action classification accuracy as a threshold to determine pass or fail, the dimension reduction unit 2603 may perform learning on all of the configurable dimension counts, calculate the action classification accuracy, and determine an action classification model and a dimension count on the basis of the calculated action classification accuracy.

The action classification accuracy calculated by the action learning unit 2603 may alternatively be regarded as the contribution ratio of Embodiment 1. For example, the acquired variable that has gone through dimension reduction is associated with the action classification accuracy calculated on the basis of the variable, and the calculated action classification accuracy is regarded a contribution ratio for the original information of the variable that was subjected to dimension reduction, which was used for calculation. The dimension count control unit 2601 determines which variable is to be used for control among the variables that were subjected to dimension reduction, on the basis of the action classification accuracy acting as the contribution ratio.

<Learning Process>

Figure 27:
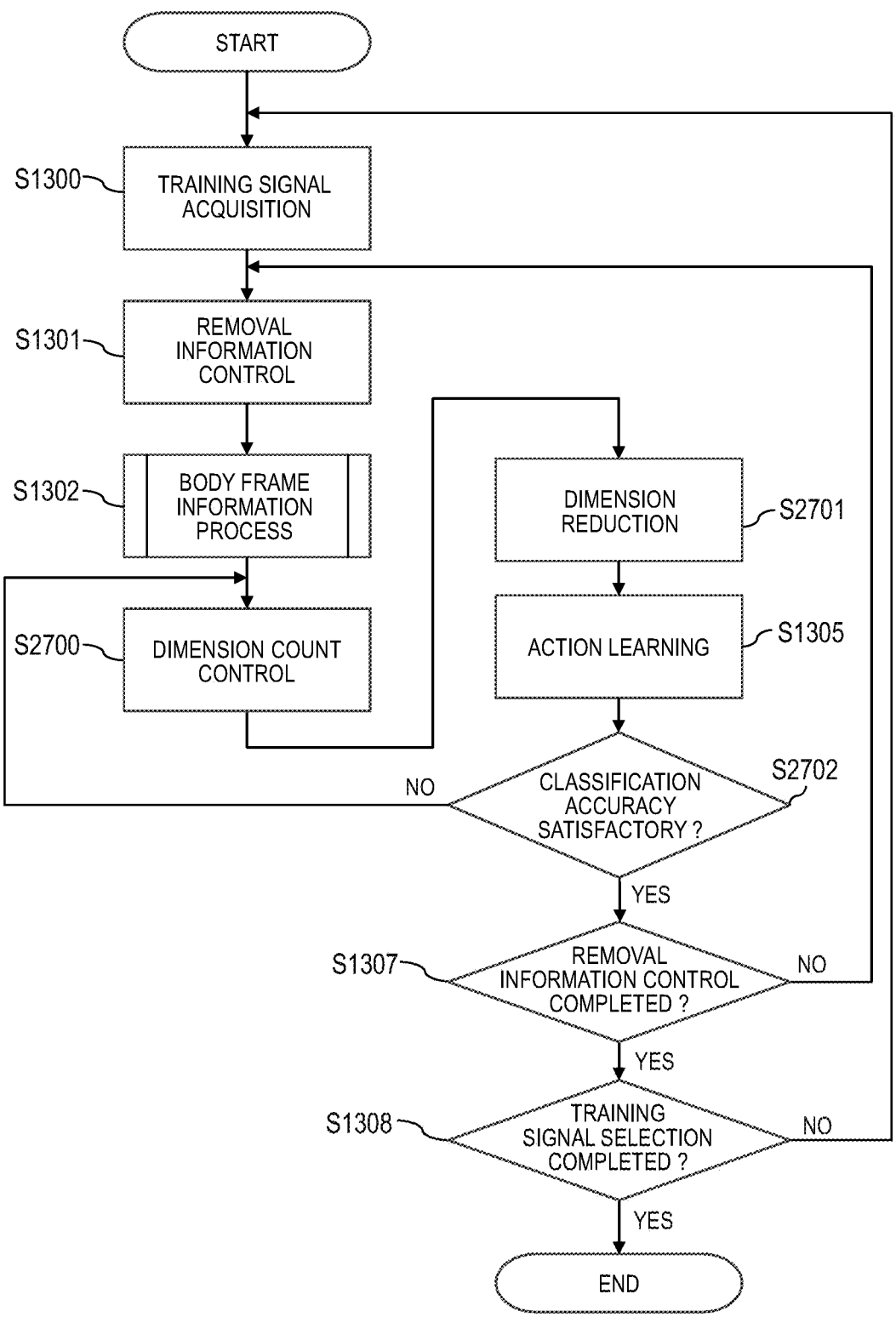
FIG. 27 is a flowchart showing an example of detailed process steps of a learning process performed by the server (learning apparatus) according to Embodiment 7.

FIG. 27 is a flowchart showing an example of detailed process steps of a learning process performed by the server 101 (learning apparatus) according to Embodiment 7. The server 101 uses the dimension count control unit 2601 to determine a dimension count. In this process, the dimension count control unit 2601 selects a prescribed dimension count if dimension reduction is performed for the first time, and selects a dimension count that has yet to be selected if the dimension count has been performed before (step S2700).

Next, the server 101 performs dimension reduction in the dimension reduction unit 2601 on the basis of the determined dimension count, and generates a new variable (S2701). In step S2702, the server 101 determines whether the action classification accuracy acquired from the action learning unit 2602 is acceptable or not. If acceptable, the server 101 progresses to step S1307, and if not acceptable, the server 101 returns to step S2700.

In this manner, according to Embodiment 7, by changing the dimension count based on the target action classification accuracy, and repeating the dimension reduction, it is possible to distinguish complex actions at a high accuracy.

The action recognition apparatus and the learning apparatus of Embodiments 1 to 7 described above may be configured as in (1) to (28) below.

(1) An action recognition apparatus (client 2), comprising:
a processor 201 executing programs; and a storage device 202 storing the programs, wherein the action recognition apparatus can access a group of action classification models each learned for a component group, using component groups attained from a shape of an object to be learned (body frame information 320) through component analysis (principal component analysis or independent component analysis) for generating statistical components in multivariate analysis, and actions of the object to be learned, wherein the processor 201 performs: a detection process of detecting a shape of an object to be recognized (body frame information 320) from to-be-analyzed data acquired from a sensor 103; a component analysis process of generating one or more components and respective contribution ratios of the components through the component analysis, on the basis of the shape of the object to be recognized that was detected by the detection process; a determination process of determining an ordinal number k indicating each dimension of said one or more components on the basis of a cumulative contribution ratio attained from the respective contribution ratios; a selection process of selecting, among the group of action classification models, a specific action classification model in which learning was performed with the same component group as a specific component group including one or more components with the ordinal number indicating the dimension determined by the determination process; and an action recognition process of inputting the specific component group into the specific action classification model selected by the selection process, thereby outputting recognition results indicating actions of the object to be recognized.

In this manner, by providing an action classification model corresponding to the shape of the object to be learned, it is possible to recognize a plurality of types of actions of an object to be recognized at a high accuracy.

(2) The action recognition apparatus according to (1), wherein, in each action classification model of the group of action classification models, learning was performed for each component group, using component groups attained from the shape of the object to be learned and a plurality of vertex angles (joint angle 370) constituting said shape, and actions of the object to be learned, wherein the processor 201 performs a calculation process of calculating a plurality of vertex angles (joint angle 370) constituting the shape of the object to be recognized on the basis of the shape of the object to be recognized, and wherein, in the component analysis process, the processor 201 generates said one or more components and the contribution ratios on the basis of the shape of the object to be recognized and the vertex angles of the object to be recognized that were calculated by the calculation process.

In this manner, it is possible to recognize a plurality of types of actions of an object to be recognized at a high accuracy, in accordance with a change of the shape due to the vertex angles.

(3) The action recognition apparatus according to (1), wherein, in each action classification model of the group of action classification models, learning was performed for each component group, using component groups attained from the shape of the object to be learned and an amount of movement of the object to be learned, and actions of the object to be learned, wherein the processor 201 performs a calculation process of calculating an amount of movement of the object to be recognized on the basis of a plurality of shapes of the object to be recognized taken at different timings, and wherein, in the component analysis process, the processor 201 generates said one or more components and the contribution ratios on the basis of the shape of the object to be recognized and the amount of movement of the object to be recognized calculated by the calculation process.

In this manner, it is possible to recognize a plurality of types of actions of an object to be recognized at a high accuracy, in accordance with a gradual change of the shape due to movements.

(4) The action recognition apparatus according to (1), wherein the processor 201 performs a first normalization process of normalizing a size of a shape of the object to be recognized, and wherein, in the component analysis process, the processor generates said one or more components and said contribution ratios on the basis of the shape of the object to be recognized that has undergone first normalization by the first normalization process.

In this manner, by improving versatility in action classification, it is possible to suppress erroneous recognition.

(5) The action recognition apparatus according to (2), wherein the processor 201 performs a second normalization process of normalizing a possible value range of a shape and vertex angles of the object to be recognized, and wherein, in the component analysis process, the processor 201 generates said one or more components and said contribution ratios on the basis of the shape and vertex angles (joint angle 370) of the object to be recognized that have undergone second normalization in the second normalization process.

In this manner, by suppressing variations of value ranges among different data types of shape and angles, it is possible to improve the accuracy of action recognition.

(6) The action recognition apparatus according to (1), wherein, in the determination process, the processor 201 determines an ordinal number k indicating each dimension of components necessary for the cumulative contribution ratio to exceed a threshold value.

The cumulative contribution ratio is a measure indicating the degree to which the newly generated plurality of components express the amount of information in the original data, and thus, by referencing to the cumulative contribution ratio, it is possible to suppress an increase in the dimension count.

(7) The action recognition apparatus according to (1), wherein, in each action classification model of the group of action classification models, learning was performed for each combination of a partially removed shape of an object to be learned and a component group, using component groups attained from the partially removed shape and actions of the object to be learned, wherein the processor 201 performs a determination process of determining a partially removed shape of the object to be recognized, wherein, in the component analysis process, the processor 201 generates said one or more components and respective contribution ratios of said one or more components on the basis of the partially removed shape of the object to be recognized that was determined by the determination process, and wherein, in the selection process, the processor 201 selects, among the group of action classification models, a specific action classification model in which learning was performed with a combination of the same partially removed shape as the partially removed shape of the object to be recognized and the same component group as the specific component group.

Even if a part of the shape of the object to be recognized is removed, it is possible to perform action recognition at a high accuracy using an action classification model reflecting the partial removal.

(8) The action recognition apparatus according to (1), wherein the processor 201 performs an interpolation process of interpolating a removed part of the shape of the object to be recognized, if any, and wherein, in the component analysis process, the processor generates said one or more components and said contribution ratios on the basis of the shape of the object to be recognized that was interpolated by the interpolation process.

In this manner, by providing an appropriate input to an action classification model generated by an object to be learned with no part removed from the shape thereof, it is possible to suppress a reduction in action recognition accuracy.

(9) An action recognition apparatus (client 102), comprising: a processor 201 executing programs; and a storage device 202 storing the programs, wherein the action recognition apparatus can access a group of action classification models each learned for a component group, using component groups in an ascending order starting with a first variable attained from a shape of an object to be learned (body frame information 320) through dimension reduction (principal component analysis, independent component analysis, stochastic neighbor embedding (SNE), t-distributed stochastic neighbor embedding (t-SNE), uniform manifold approximation and projection (UMAP), Isomap, locally linear embedding (LLE), Laplacian eighmap, LargeVis, or diffusion map) for generating statistical components in multivariate analysis and actions of the object to be learned, wherein the processor 201 performs: a detection process of detecting a shape of an object to be recognized from to-be-analyzed data attained from a sensor 103; a dimension reduction process of generating one or more components and respective contribution ratios of the components through the dimension reduction, on the basis of the shape of the object to be recognized that was detected by the detection process; a determination process of determining an ordinal number k indicating each dimension of components in an ascending order starting with the first variable among said one or more components, on the basis of the respective contribution ratios; a selection process of selecting, among the group of action classification models, a specific action classification model in which learning was performed using the same component group as a specific component group from the first variable up to a component of the ordinal number indicating the dimension determined in the determination process; and an action recognition process of inputting the specific component group into the specific action classification model selected by the selection process, thereby outputting recognition results indicating actions of the object to be recognized.

In this manner, by providing an action classification model corresponding to the shape of the object to be learned, it is possible to recognize a plurality of types of actions of an object to be learned at a high accuracy.

(10) The action recognition apparatus according to (9), wherein, in each action classification model of the group of action classification models, learning was performed for each component group, using component groups in an ascending order starting with the first variable attained from the shape of the object to be learned and a plurality of vertex angles (joint angle 370) constituting said shape, and actions of the object to be learned, wherein the processor 201 angle 370) constituting the shape of the object to be recognized on the basis of the shape of the object to be recognized, and wherein, in the dimension reduction process, the processor 201 generates said one or more components and the contribution ratios on the basis of the shape of the object to be recognized and the vertex angles of the object to be recognized that were calculated by the calculation process.

In this manner, it is possible to recognize a plurality of types of actions of an object to be recognized at a high accuracy, in accordance with a change of the shape due to the vertex angles.

(11) The action recognition apparatus according to (9), wherein, in each action classification model of the group of action classification models, learning was performed for each component group, using component groups in an ascending order starting with the first variable attained from the shape of the object to be learned and an amount of movement of the object to be learned, and actions of the object to be learned, wherein the processor 201 performs a calculation process of calculating an amount of movement of the object to be recognized on the basis of a plurality of shapes of the object to be recognized taken at different timings, and wherein, in the dimension reduction process, the processor 201 generates said one or more components and the contribution ratios on the basis of the shape of the object to be recognized and the amount of movement of the object to be recognized that was calculated by the calculation process.

In this manner, it is possible to recognize a plurality of types of actions of an object to be recognized at a high accuracy, in accordance with a gradual change of the shape over time due to movements.

(12) The action recognition apparatus according to (9), wherein the processor 201 performs a first normalization process of normalizing the size of a shape of the object to be recognized, and wherein, in the dimension reduction process, the processor generates said one or more components and said contribution ratios on the basis of the shape of the object to be recognized that has undergone first normalization by the first normalization process.

In this manner, by improving versatility in action classification, it is possible to suppress erroneous recognition.

(13) The action recognition apparatus according to (10), wherein the processor 201 performs a second normalization process of normalizing a possible value range of the shape of the object to be recognized and vertex angles, and wherein, in the dimension reduction process, the processor 201 generates said one or more components and said contribution ratios on the basis of the shape of the object to be recognized and the vertex angles (joint angles 370) that have undergone second normalization by the second normalization process.

In this manner, by suppressing variations of value ranges among different data types of shape and angles, it is possible to improve the accuracy of action recognition.

(14) The action recognition apparatus according to (9), wherein, in the determination process, the processor 201 determines an ordinal number k indicating each dimension of components in an ascending order starting from the first variable necessary for the cumulative contribution ratio starting with the first variable to exceed a threshold value.

The cumulative contribution ratio is a measure indicating the degree to which the newly generated plurality of components express the amount of information in the original data, and thus, by referencing to the cumulative contribution ratio, it is possible to suppress an increase in the dimension count.

(15) The action recognition apparatus according to (9), wherein, in each action classification model of the group of action classification models, learning was performed for each combination of a partially removed shape of an object to be learned and a component group, using component groups in an ascending order stating with the first variable attained from the partially removed shape and actions of the object to be learned, wherein the processor 201 performs a determination process of determining a partially removed shape of the object to be recognized, wherein, in the dimension reduction process, the processor 201 generates said one or more components and respective contribution ratios of said one or more component on the basis of the partially removed shape of the object to be recognized that was determined by the determination process, and wherein, in the selection process, the processor 201 selects, among the group of action classification models, a specific action classification model in which learning was performed with a combination of the same partially removed shape as the partially removed shape of the object to be recognized and the same component group as the specific component group.

Even if a part of the shape of the object to be recognized is removed, it is possible to perform action recognition at a high accuracy using an action classification model reflecting the partial removal.

(16) The action recognition apparatus according to (9), wherein the processor 201 performs an interpolation process of interpolating a partial removal of the shape of the object to be recognized, if any, and wherein, in the dimension reduction process, the processor 201 generates said one or more components and said contribution ratios on the basis of the shape of the object to be recognized that was interpolated by the interpolation process.

In this manner, by providing an appropriate input to an action classification model generated for an object to be learned with no part removed from the shape thereof, it is possible to suppress a reduction in action recognition accuracy.

(17) A learning apparatus, comprising: a processor 201 executing programs; and a storage device 202 storing the programs, wherein the processor 201 performs: an acquisition process of acquiring training data including a shape and actions of an object to be learned; a component analysis process of generating one or more components by component analysis (principal component analysis or independent component analysis) for generating statistical components in multivariate analysis, on the basis of the shape of the object to be learned that was acquired by the acquisition process; a control process of controlling an ordinal number indicating each dimension of said one or more components based on an allowable calculation amount; and an action learning process of learning actions of the object to be learned and generating an action classification model for classifying actions of the object to be learned on the basis of a component group including one or more components with the ordinal number indicating the dimension controlled by the control process, and actions of the object to be learned.

In this manner, by providing a plurality of types of action classification models corresponding to different shapes of the object to be learned, it is possible to recognize a plurality of types of actions of an object to be recognized at a high accuracy.

(18) The learning apparatus according to (17), wherein the processor 201 performs a calculation process of calculating a plurality of vertex angles (joint angle 370) constituting the shape of the object to be learned on the basis of the shape of the object to be learned, and wherein, in the component analysis process, the processor 201 generates said one or more components on the basis of the shape of the object to be learned and the vertex angles of the object to be learned that were calculated in the calculation process.

In this manner, by providing a plurality of types of action classification models corresponding to a change in shape due to the vertex angles, it is possible to recognize, at a high accuracy, a plurality of types of actions corresponding to a change in shape due to the vertex angles of an object to be recognized.

(19) The learning apparatus according to (17), wherein the processor 201 performs a calculation process of calculating an amount of movement of the object to be learned on the basis of a plurality of shapes of the object to be learned taken at different timings, and wherein, in the component analysis process, the processor 201 generates said one or more components on the basis of the shape of the object to be learned and the amount of movement of the object to be learned that was calculated by the calculation process.

In this manner, by providing a plurality of types of action classification models corresponding to a gradual change in shape over time due to movements, it is possible to recognize, at a high accuracy, a plurality of types of actions corresponding to a gradual change in shape over time due to movements.

(20) The learning apparatus according to (17), wherein the processor 201 performs a first normalization process of normalizing the size of a shape of the object to be learned, and wherein, in the component analysis process, the processor generates said one or more components on the basis of the shape of the object to be learned that has undergone first normalization in the first normalization process.

In this manner, by improving versatility in action classification, it is possible to suppress erroneous learning.

(21) The learning apparatus according to (18), wherein the processor 201 performs a second normalization process of normalizing a possible value range of the shape of the object to be learned and vertex angles, and wherein, in the component analysis process, the processor 201 generates said one or more components on the basis of the shape of the object to be learned and the vertex angles that have undergone second normalization in the second normalization process.

In this manner, by suppressing variations of value ranges among different data types of shape and angles, it is possible to improve the accuracy of action classification learning.

(22) The learning apparatus according to (17), wherein the processor 201 performs a removal control process of removing part of the shape of the object to be learned, wherein, in the component analysis process, the processor 201 generates said one or more components on the basis of the partially removed shape of the object to be learned that was obtained by the removal control process, and wherein, in the action learning process, the processor 201 learns actions of the object to be learned, generates the action classification model, and associates the action classification model with removal information regarding the partially removed shape on the basis of the component group and actions of the object to be learned.

By generating a shape having a part thereof deliberately removed, it is possible to increase the number of types of action classification models. In this manner, it is possible to achieve highly accurate action recognition corresponding to different shapes of an object to be recognized.

(23) A learning apparatus, comprising: a processor 201 executing programs; and a storage device 202 storing the programs, wherein the processor 201 performs an acquisition process of acquiring training data including a shape and actions of an object to be learned; a dimension reduction process of generating one or more components by dimension reduction (principal component analysis, independent component analysis, stochastic neighbor embedding (SNE), t-distributed stochastic neighbor embedding (t-SNE), uniform manifold approximation and projection (UMAP), Isomap, locally linear embedding (LLE), Laplacian eigenmap, LargeVis, and diffusion map for generating statistical components in multivariate analysis, on the basis of the shape of the object to be learned that was acquired by the acquisition process; a control process of controlling an ordinal number indicating each dimension of components in an ascending order starting with the first variable among said one or more components, on the basis of an allowable calculation amount; an action learning process of learning actions of the object to be learned and generating an action classification model for classifying actions of the object to be learned on the basis of a component group starting with the first variable up to a component of the ordinal number indicating the dimension controlled by the control process, and actions of the object to be learned.

In this manner, by providing a plurality of types of action classification models corresponding to different shapes of the object to be learned, it is possible to recognize a plurality of types of actions of an object to be recognized at a high accuracy.

(24) The learning apparatus according to (23), wherein the processor 201 performs a calculation process of calculating a plurality of vertex angles (joint angle 370) constituting the shape of the object to be learned on the basis of the shape of the object to be learned, and wherein, in the dimension reduction process, the processor 201 generates said one or more components on the basis of the shape of the object to be learned and the vertex angles of the object to be learned that were calculated in the calculation process.

In this manner, by providing a plurality of types of action classification models corresponding to a change in shape due to the vertex angles, it is possible to recognize, at a high accuracy, a plurality of types of actions corresponding to a change in shape due to the vertex angles of an object to be recognized.

(25) The learning apparatus according to (23), wherein the processor 201 performs a calculation process of calculating an amount of movement of the object to be learned on the basis of a plurality of shapes of the object to be learned taken at different timings, and wherein, in the dimension reduction process, the processor 201 generates said one or more components on the basis of the shape of the object to be learned and the amount of movement of the object to be learned that was calculated in the calculation process.

In this manner, by providing a plurality of types of action classification models corresponding to a gradual change in shape due over time to movements, it is possible to recognize, at a high accuracy, a plurality of types of actions corresponding to a gradual change in shape over time due to movements.

(26) The learning apparatus according to (23), wherein the processor 201 performs a first normalization process of normalizing the size of a shape of the object to be learned, and wherein, in the dimension reduction process, the processor generates said one or more components on the basis of the shape of the object to be learned that has undergone first normalization in the first normalizing process.

In this manner, by improving versatility in action classification, it is possible to suppress erroneous learning.

(27) The learning apparatus according to (24), wherein the processor 201 performs a second normalization process of normalizing a possible value range of the shape of the object to be learned and vertex angles, and wherein, in the dimension reduction process, the processor 201 generates said one or more components on the basis of the shape of the object to be learned and the vertex angles that have undergone second normalization in the second normalization process.

In this manner, by suppressing variations of value ranges among different data types of shape and angles, it is possible to improve the accuracy of action classification learning.

(28) The learning apparatus according to (23), wherein the processor 201 performs a removal control process of removing part of the shape of the object to be learned, wherein, in the dimension reduction process, the processor 201 generates said one or more components on the basis of the partially removed shape of the object to be learned that was obtained by the removal control process, and wherein, in the action learning process, the processor 201 learns actions of the object to be learned, generates the action classification model, and associates the action classification model with removal information regarding the partially removed shape on the basis of the component group and actions of the object to be learned.

By generating a shape having a part thereof deliberately removed, it is possible to increase the number of types of action classification models. In this manner, it is possible to achieve highly accurate action recognition corresponding to different shapes of an object to be recognized.

It should be noted that this disclosure is not limited to the above-mentioned embodiments, and encompasses various modification examples and the equivalent configurations within the scope of the appended claims without departing from the gist of this disclosure. For example, the above-mentioned embodiments are described in detail for a better understanding of this disclosure, and this disclosure is not necessarily limited to what includes all the configurations that have been described. Further, a part of the configurations according to a given embodiment may be replaced by the configurations according to another embodiment. Further, the configurations according to another embodiment may be added to the configurations according to a given embodiment. Further, a part of the configurations according to each embodiment may be added to, deleted from, or replaced by another configuration.

Further, a part or entirety of the respective configurations, functions, processing modules, processing means, and the like that have been described may be implemented by hardware, for example, may be designed as an integrated circuit, or may be implemented by software by a processor interpreting and executing programs for implementing the respective functions.

The information on the programs, tables, files, and the like for implementing the respective functions can be stored in a storage device such as a memory, a hard disk drive, or a solid state drive (SSD) or a recording medium such as an IC card, an SD card, or a DVD.

Further, control lines and information lines that are assumed to be necessary for the sake of description are described, but not all the control lines and information lines that are necessary in terms of implementation are described. It may be considered that almost all the components are connected to one another in actuality.

What is claimed is:

1. An action recognition apparatus, comprising: a processor executing programs; and a storage device storing the programs, wherein the action recognition apparatus can access a group of action classification models each learned for a component group, using component groups attained from a shape of an object to be learned through component analysis for generating statistical components in multivariate analysis, and actions of the object to be learned, wherein the processor performs:

a detection process of detecting a shape of an object to be recognized from to-be-analyzed data;

a component analysis process of generating one or more components and respective contribution ratios of said components through the component analysis, on the basis of the shape of the object to be recognized that was detected by the detection process;

a removal control process of removing part of the shape of the object to be recognized, wherein, in the component analysis process, the processor generates said one or more components on the basis of the partially removed shape of the object to be learned that was obtained by the removal control process;

a determination process of determining an ordinal number indicating each dimension of said one or more components on the basis of a cumulative contribution ratio attained from the respective contribution ratios;

a selection process of selecting, among the group of action classification models, a specific action classification model in which learning was performed with the same component group as a specific component group including one or more components with the ordinal number indicating the dimension determined by the determination process; and an action recognition process of inputting the specific component group into the specific action classification model selected by the selection process, thereby outputting recognition results indicating actions of the object to be recognized, wherein, in each action classification model of the group of action classification models, the processor learns actions of the object to be learned, generates the action classification model, and associates the action classification model with removal information regarding the partially removed shape on the basis of the component group and actions of the object to be learned, wherein the processor performs a determination process of determining a partially removed shape of the object to be recognized, wherein, in the component analysis process, the processor generates said one or more components and the respective contribution ratios of said one or more components on the basis of the partially removed shape of the object to be recognized that was determined by the determination process, and wherein, in the selection process, the processor selects, among the group of action classification models, a specific action classification model in which learning was performed with a combination of the same partially removed shape as the partially removed shape of the object to be recognized and the same component group as the specific component group;

wherein the action recognition process further determines a region to which a component belongs according to boundary lines and a boundary plane set by the action classification model, and recognizes the action according to the determined region; and wherein the processor further determines the component groups based on respective cumulative contribution ratios of perspective component groups being a maximum but not exceeding a predetermined threshold.

2. The action recognition apparatus according to claim 1, wherein the processor performs an interpolation process of interpolating a removed part of the shape of the object to be recognized, if any, and wherein, in the component analysis process, the processor generates said one or more components and said contribution ratios on the basis of the shape of the object to be recognized that was interpolated by the interpolation process.

3. An action recognition method performed by an action recognition apparatus that includes: a processor executing programs; and a storage device storing the programs,
wherein the action recognition apparatus can access a group of action classification models each learned for a component group, using component groups attained from a shape of an object to be learned through component analysis for generating statistical components in multivariate analysis, and actions of the object to be learned,
wherein the action recognition method comprises:
a detection process in which the processor detects a shape of an object to be recognized from to-be-analyzed data;
a component analysis process in which the processor generates one or more components and respective contribution ratios of said components through the component analysis, on the basis of the shape of the object to be recognized that was detected by the detection process;
a removal control process of removing part of the shape of the object to be recognized, wherein, in the component analysis process, the processor generates said one or more components on the basis of the partially removed shape of the object to be learned that was obtained by the removal control process;
a determination process in which the processor determines an ordinal number indicating each dimension of said one or more components on the basis of a cumulative contribution ratio attained from the respective contribution ratios;
a selection process in which the processor selects, among the group of action classification models, a specific action classification model in which learning was performed with the same component group as a specific component group including one or more components with the ordinal number indicating the dimension determined by the determination process; and
an action recognition process in which the processor inputs the specific component group into the specific action classification model selected by the selection process, thereby outputting recognition results indicating actions of the object to be recognized,
wherein, in each action classification model of the group of action classification models, the processor learns actions of the object to be learned, generates the action classification model, and associates the action classification model with removal information regarding the partially removed shape on the basis of the component group and actions of the object to be learned,
wherein the processor performs a determination process of determining a partially removed shape of the object to be recognized,
wherein, in the component analysis process, the processor generates said one or more components and the respective contribution ratios of said one or more components on the basis of the partially removed shape of the object to be recognized that was determined by the determination process,
wherein, in the selection process, the processor selects, among the group of action classification models, a specific action classification model in which learning was performed with a combination of the same partially removed shape as the partially removed shape of the object to be recognized and the same component group as the specific component group,
the action recognition process further determines a region to which a component belongs according to boundary lines and a boundary plane set by the action classification model, and recognizes the action according to the determined region, and
wherein the component groups are based on respective cumulative contribution ratios of perspective component groups being a maximum but not exceeding a predetermined threshold.

* * * * *